(12) United States Patent
Marumo

(10) Patent No.: US 12,062,053 B2
(45) Date of Patent: Aug. 13, 2024

(54) INFORMATION PROCESSING SYSTEM, PURCHASE REGISTRATION DEVICE, AND CONTROL METHOD THEREOF

(71) Applicant: TOSHIBA TEC KABUSHIKI KAISHA, Tokyo (JP)

(72) Inventor: Nobuyuki Marumo, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 17/592,103

(22) Filed: Feb. 3, 2022

(65) Prior Publication Data

US 2022/0391915 A1 Dec. 8, 2022

(30) Foreign Application Priority Data

Jun. 7, 2021 (JP) ................................. 2021-095209

(51) Int. Cl.
*G06Q 30/00* (2023.01)
*G06K 7/14* (2006.01)
*G06Q 30/012* (2023.01)

(52) U.S. Cl.
CPC ......... *G06Q 30/012* (2013.01); *G06K 7/1413* (2013.01)

(58) Field of Classification Search
CPC ............................ G06Q 30/012; G06K 7/1413
See application file for complete search history.

(56) References Cited

U.S. PATENT DOCUMENTS

| 9,258,296 B2 * | 2/2016 | Juthani | G06Q 30/0225 |
| 10,251,128 B2 * | 4/2019 | Nguyen | H04L 51/18 |
| 2014/0162598 A1 * | 6/2014 | Villa-Real | G07F 7/0886 455/411 |
| 2016/0012465 A1 * | 1/2016 | Sharp | G06Q 20/321 705/14.17 |
| 2017/0011606 A1 * | 1/2017 | Ceccon | G07G 1/0054 |
| 2017/0083892 A1 * | 3/2017 | Taira | G06Q 20/208 |
| 2018/0350180 A1 * | 12/2018 | Onischuk | G07C 13/00 |
| 2019/0156090 A1 * | 5/2019 | Hui | G06K 7/10861 |
| 2020/0219204 A1 * | 7/2020 | Moetteli | A47F 10/06 |

FOREIGN PATENT DOCUMENTS

| CN | 101167080 A | * | 4/2008 | ............. G06F 21/32 |
| CN | 103455942 A | * | 12/2013 | |
| CN | 107392710 A | * | 11/2017 | ......... G06Q 30/0621 |

(Continued)

OTHER PUBLICATIONS

Selim Aissi, "E-Business Process Modeling: The Next Big Step", 2002, IEEE, pp. 55-62. (Year: 2002).*

(Continued)

*Primary Examiner* — Tan D Nguyen
(74) *Attorney, Agent, or Firm* — FOLEY & LARDNER LLP

(57) ABSTRACT

An information processing device includes: a first acquirer, a second acquirer, and a switcher. The first acquirer acquires user information of a user who executes a registration operation on a purchased merchandise. The second acquirer acquires a first time value for the registration operation based on the user information. The switcher switches a registration operation method for the purchased merchandise when a second time value required for the registration operation exceeds the first time value.

14 Claims, 23 Drawing Sheets

(56) References Cited

FOREIGN PATENT DOCUMENTS

| WO | WO-2005029418 A2 | * | 3/2005 | ........... G06Q 20/045 |
| WO | WO-2005048150 A1 | * | 5/2005 | ............. G06Q 50/34 |
| WO | WO-2009060004 A1 | * | 5/2009 | ........... B65G 19/287 |
| WO | WO-2018043732 A1 | * | 3/2018 | ........... A63F 13/213 |
| WO | WO-2018104834 A1 | * | 6/2018 | ............. G06F 1/163 |
| WO | WO-2018203512 A1 | * | 11/2018 | ........... B62B 5/0096 |

OTHER PUBLICATIONS

S.C. Hui, "Data Mining for Customer Service Support", 2000, Information & Management 38, pp. 1-13. (Year: 2000).*

Sunil Kumar Bidhan, "Anatomy of Big lot Data Analytics," 2019, International Conference on Inventive Systems and Control (ICISC 2019), pp. 123-127. (Year: 2019).*

Xiao Yang, "Quicksilver: Fast predictive image registration—A deep learning approach," 2017, NeuroImage 158, pp. 378-396. (Year: 2017).*

Shuang Hao, "PREDATOR: Proactive Recognition and Elimination of Domain Abuse at Time of Registration", 2016, CCS 2016, pp. 1568-1579. (Year: 2016).*

* cited by examiner

FIG. 4

| AGE GROUP | FIRST AVERAGE REGISTRATION TIME |
|---|---|
| 10'S | 15 SECONDS |
| 20'S | 13 SECONDS |
| 30'S | 10 SECONDS |
| 40'S | 12 SECONDS |
| 50'S | 15 SECONDS |
| ⋮ | ⋮ |

| No. | TRANSACTION DATE AND TIME | MERCHANDISE CODE 6312 | MERCHANDISE NAME | PRICE | ACTUAL REGISTRATION TIME |
|---|---|---|---|---|---|
| 1. | | | | | |
| 2. | | | | | |
| ⋮ | ⋮ | ⋮ | ⋮ | ⋮ | ⋮ |

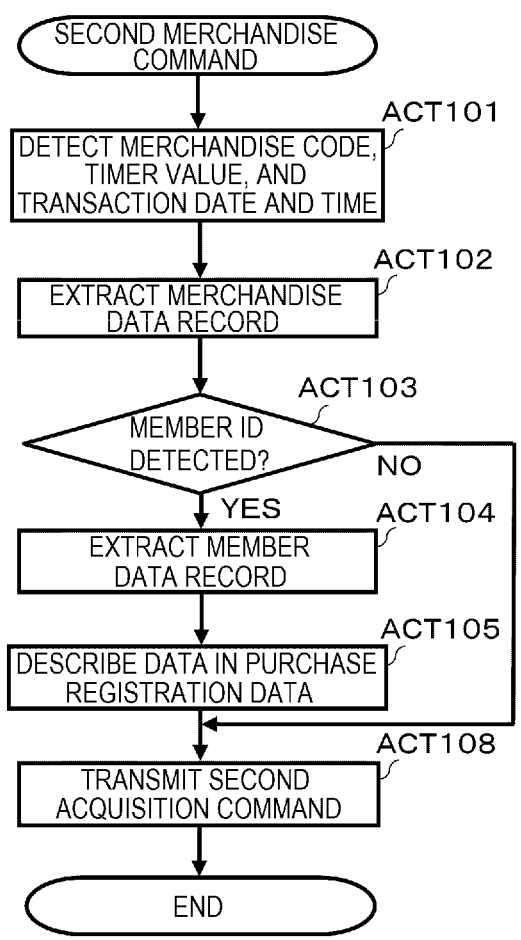

INFORMATION PROCESSING SYSTEM, PURCHASE REGISTRATION DEVICE, AND CONTROL METHOD THEREOF

CROSS-REFERENCE TO RELATED APPLICATION

This application is based upon and claims the benefit of priority from Japanese Patent Application No. 2021-095209, filed on Jun. 7, 2021, the entire contents of which are incorporated herein by reference.

FIELD

Embodiments described herein relate to an information processing system, an information processing device, and a control method thereof.

BACKGROUND

In recent years, in a retail store such as a supermarket, a self-service point of sales (POS) terminal attracts attention, thanks to various advantages it offers, for example, reduced labor cost, suppressed infection of an infectious disease, and the like. The self-service POS terminal is a full-self-service settlement terminal in which customers perform an operation from registration to settlement of a purchased merchandise by themselves. Examples of a registration operation method for the purchased merchandise include a method of performing purchase registration using barcode recognition in which a merchandise is specified by reading a barcode representing a merchandise code unique to the merchandise and attached to the purchased merchandise, and a method of performing purchase registration using object recognition in which the merchandise is recognized based on an image obtained by imaging an appearance of the purchased merchandise. A user who is unfamiliar with the registration operation methods may be confused due to the registration operation and may feel stressed since a time required for the purchase registration is long. Therefore, there is a demand for development of a technique capable of reducing the stress caused by the user executing the registration operation on the purchased merchandise.

DESCRIPTION OF THE DRAWINGS

FIG. 4 is a schematic diagram showing an example of an age group table;

FIG. 7 is a schematic diagram showing an example of purchase registration data;

FIG. 23 is a flowchart showing a main part control procedure of a processor in a store server.

DETAILED DESCRIPTION

In general, according to one embodiment, provided are an information processing system, an information processing device, and a control method thereof that can reduce stress caused by a user executing a registration operation on a purchased merchandise.

According to the embodiment, the information processing device includes: a first acquirer, a second acquirer, and a switcher. The first acquirer acquires user information of a user who executes a registration operation on a purchased merchandise. The second acquirer acquires a first time value for the registration operation based on the user information. The switcher switches a registration operation method for the purchased merchandise when a second time value required for the registration operation exceeds the first time value.

Various embodiments will be described hereinafter with reference to the accompanying drawings.

First Embodiment

Figure 1:
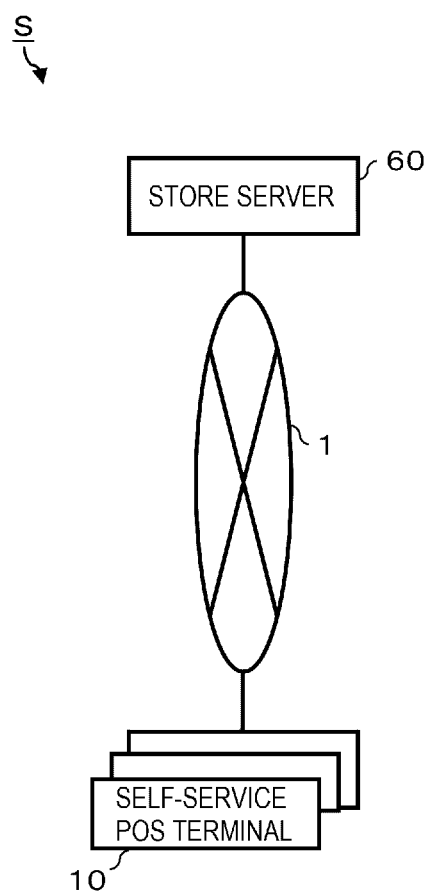
FIG. 1 is a block diagram showing a schematic configuration of an information processing system.

FIG. 1 is a block diagram showing a schematic configuration of an information processing system S. The information processing system S includes a plurality of self-service POS terminals 10 and a store server 60. The self-service POS terminal 10 and the store server 60 are connected to a communication network 1 such as a local area network (LAN). The LAN may be wired or wireless.

The self-service POS terminal 10 is a full-self-service settlement terminal in which customers perform an operation from registration to settlement of a merchandise to be purchased by the customer, that is, a so-called purchased merchandise, by themselves. The self-service POS terminal 10 is an example of an information processing device.

The store server 60 is a computer that manages information related to a store into which the information processing system S is introduced and that executes various types of information processing related to the store.

Figure 2:
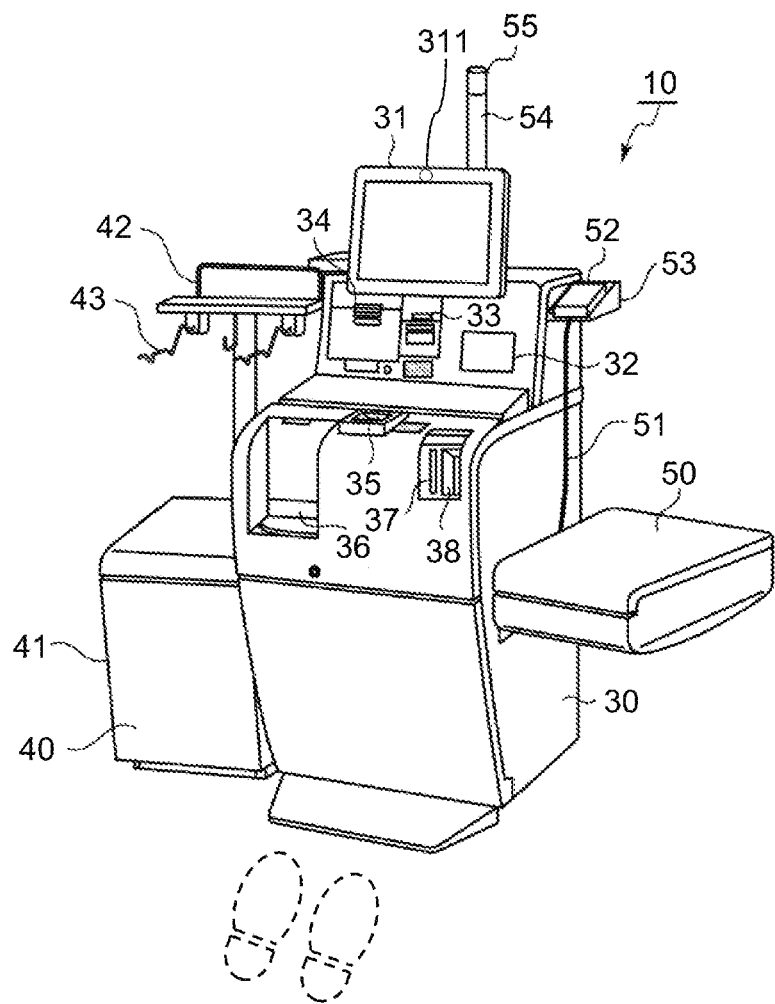
FIG. 2 is a diagram showing an appearance configuration of a self-service POS terminal.

FIG. 2 is a diagram showing an appearance configuration of the self-service POS terminal 10.

The self-service POS terminal 10 includes a main body 30 provided on a floor surface and a bagging table 40 provided beside the main body 30. A touch panel 31 is attached to an upper portion of the main body 30. The touch panel 31 includes a display and a touch sensor. The display is a device that displays various screens to a customer. The customer is a user who operates the self-service POS terminal 10. The touch sensor is a device that detects a touch input to a screen by a customer. A camera 311 is built in the touch panel 31. The camera 311 acts as an imaging device for a still image or a moving image. The camera 311 stands in front of the self-service POS terminal 10 and is provided at a position where a face of a customer facing the main body 30, the bagging table 40, a basket table 50, and the like can be imaged. The camera 311 images, for example, the customer who executes the registration operation on the purchased merchandise. The camera 311 may be externally attached to the touch panel 31. The camera 311 functions as an imaging unit (or image acquirer) that images the user who performs the registration operation on the purchased merchandise, that is, the customer.

The main body 30 is provided with the basket table 50 at a center of a side surface opposite to a side on which the bagging table 40 is provided. The basket table 50 is used by the customer coming from a sales floor to place a basket or the like in which the purchased merchandises are put. The customer stands on a front side of the main body 30 in FIG. 2 so as to view a screen of the touch panel 31. Therefore, as viewed from the customer, the basket table 50 is located on a right side and the bagging table 40 is located on a left side with respect to the main body 30. In the following description, a side on which the customer stands is referred to as a front surface of the main body 30, a side on which the bagging table 40 is provided is referred to as a left side of the main body 30, and a side on which the basket table 50 is provided is referred to as a right side of the main body 30.

The main body 30 has a reading window 32 of a scanner 17 (see FIG. 3), a card insertion port 33, a receipt issuing port 34, a coin insertion port 35, a coin dispensing port 36, a bill insertion port 37, and a bill dispensing port 38 that are formed on the front surface of the main body 30. A communication cable 51 extends from the right side surface of the main body 30 to the outside, and a reader and writer 52 for an electronic money medium is connected to a distal end of the communication cable 51. The reader and writer 52 is placed on a stand 53 provided on an upper portion of the right side surface of the main body 30.

A display pole 54 is attached to an upper surface of the main body 30. The display pole 54 includes a light emitting unit 55 that selectively emits, for example, blue light and red light at a distal end portion of the display pole 54. The display pole 54 displays a state of the self-service POS terminal 10, for example, a standby state, an operating state, a calling state, or an error state, by an emission color of the light emitting unit 55.

The bagging table 40 has a structure in which a bag holder 42 is attached to an upper portion of a housing 41. The bag holder 42 includes a pair of holding arms 43, and the holding arms 43 hold a plastic shopping bag provided in a store, a shopping bag brought by a customer, a so-called my-bag, or the like.

Figure 3:
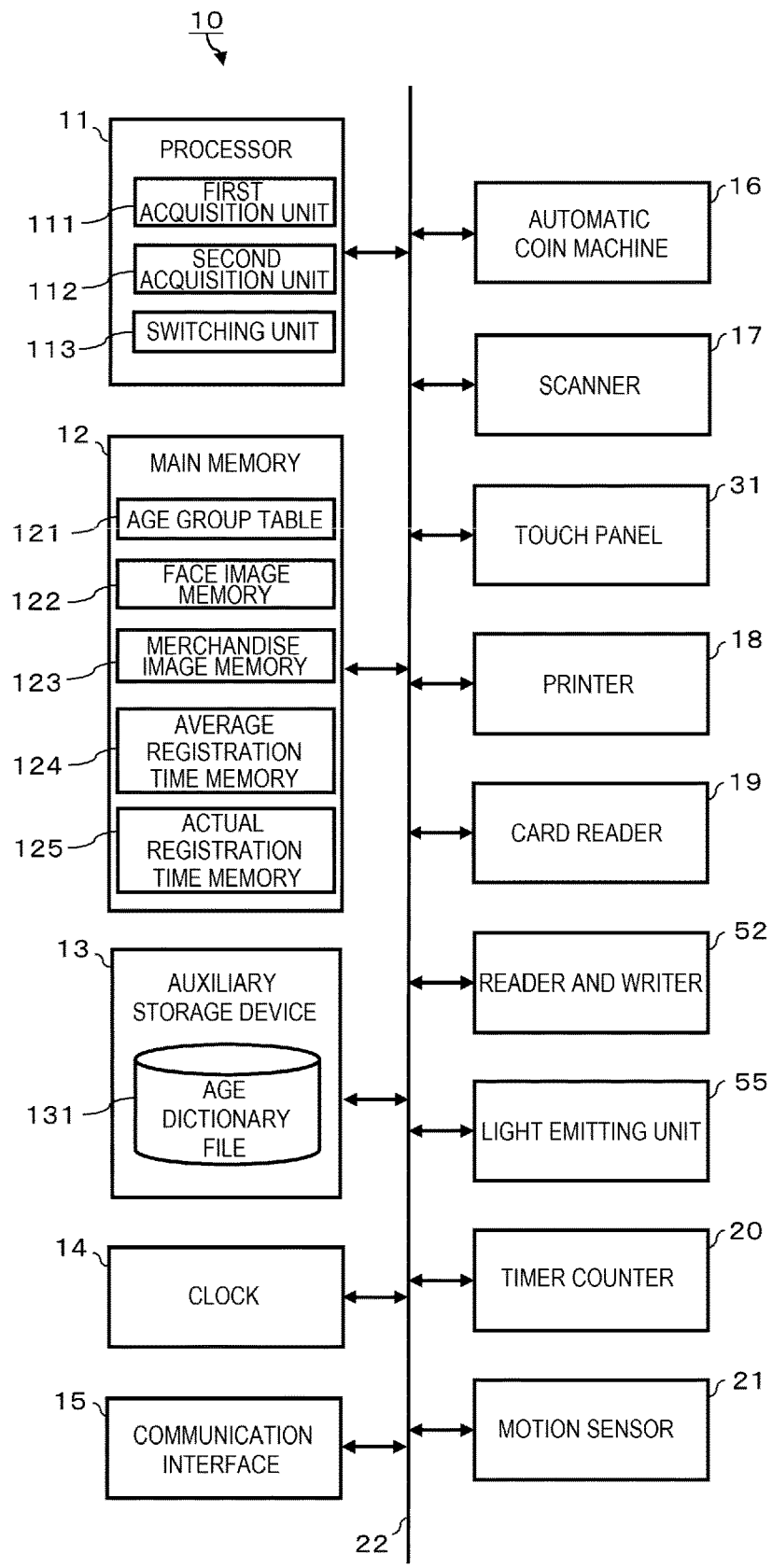
FIG. 3 is a block diagram showing a main part circuit configuration.

FIG. 3 is a block diagram showing a main part circuit configuration of the self-service POS terminal 10. As shown in FIG. 3, the self-service POS terminal 10 includes a processor 11, a main memory 12, an auxiliary storage device 13, a clock 14, a communication interface 15, an automatic coin machine 16, the scanner 17, the touch panel 31, a printer 18, a card reader 19, the reader and writer 52, the light emitting unit 55, a timer counter 20, a motion sensor 21, and a system transmission path 22. The system transmission path 22 includes an address bus, a data bus, a control signal line, and the like. The system transmission path 22 connects the processor 11 and other units directly or via a signal input and output circuit, and transmits data signals exchanged therebetween. The processor 11, the main memory 12, and the auxiliary storage device 13 are connected by the system transmission path 22 to constitute a computer of the self-service POS terminal 10.

The processor 11 corresponds to a central part of the above-described computer. The processor 11 controls each unit as a control unit to implement various functions of the self-service POS terminal 10 according to an operating system or an application program stored in the main memory 12 or the auxiliary storage device 13. In the present embodiment, it is assumed that the processor 11 executes various types of processing as the control unit. The processor 11 is, for example, a central processing unit (CPU).

The main memory 12 corresponds to a main storage portion of the above-described computer. The main memory 12 includes a non-volatile memory region and a volatile memory region. The main memory 12 stores the operating system or the application program in the non-volatile memory region. The main memory 12 may store data necessary for the processor 11 to execute processing for controlling each unit in the non-volatile or volatile memory region. The main memory 12 uses the volatile memory region as a work area in which the data is appropriately rewritten by the processor 11. The non-volatile memory region is, for example, a read only memory (ROM). The volatile memory region is, for example, a random access memory (RAM).

The auxiliary storage device 13 corresponds to an auxiliary storage portion of the above-described computer. For example, an electric erasable programmable read-only memory (EEPROM (registered trademark)), a hard disc drive (HDD), or a solid state drive (SSD) can be used as the auxiliary storage device 13. The auxiliary storage device 13 stores data used when the processor 11 performs various types of processing, data created by processing in the processor 11, and the like. The auxiliary storage device 13 may store the above-described application program.

The clock 14 functions as a time information source of the self-service POS terminal 10. The processor 11 tracks a current date and time based on time information tracked by the clock 14.

The communication interface 15 executes data communication with the store server 60 or another self-service POS terminal 10 connected via a communication network 1 according to a preset communication protocol.

The automatic coin machine 16 includes a coin unit and a bill unit. The coin unit sorts coins inserted into the coin insertion port 35 one by one, identifies a denomination of the coins, and stores the coins in a safe for each denomination. For example, the coin unit takes out the coins of the corresponding denomination from the safe based on coin data, and dispenses the coins to the coin dispensing port 36. The bill unit sorts bills inserted into the bill insertion port 37 one by one, identifies the denomination of the bills, and stores the bills in the safe for each denomination. For example, the bill unit takes out the bills of the corresponding denomination from the safe based on the coin data, and dispenses the bills to the bill dispensing port 38.

The scanner 17 images the purchased merchandise held over the reading window 32.

The printer 18 prints receipt data or the like representing details of a commercial transaction on receipt paper. The receipt paper on which the receipt data is printed is discharged from the receipt issuing port 34, cut by a cutter, and issued as a receipt.

The card reader 19 reads card data recorded on a card medium such as a credit card or a point card. The card reader 19 draws, into the main body 30, a card medium inserted into the card insertion port 33, reads the card data, and then discharges the card medium from the card insertion port 33.

The reader and writer 52 reads and writes the electronic money recorded in the electronic money medium. The electronic money medium is, for example, a non-contact type IC card. The electronic money medium may be an electronic device such as a smartphone or a tablet terminal.

The timer counter 20 counts up a timer value T at a constant cycle. The timer counter 20 counts up the timer value T every time the clock 14 tracks, for example, one second.

The motion sensor 21 detects presence of a person, for example, the customer, facing the self-service POS terminal 10. As the motion sensor 21, a well-known sensor such as an infrared sensor may be used.

In the self-service POS terminal 10 having such a configuration, a part of a volatile memory region of the main memory 12 is used as a region of an age group table 121 (see FIG. 4), a face image memory 122, a merchandise image memory 123, an average registration time memory 124, and an actual registration time memory 125. Storage destinations of the age group table 121, the face image memory 122, the merchandise image memory 123, the average registration time memory 124, and the actual registration time memory 125 are not limited to the main memory 12. The age group table 121, the face image memory 122, the merchandise image memory 123, the average registration time memory 124, and the actual registration time memory 125 may be stored in the auxiliary storage device 13.

FIG. 4 is a schematic diagram showing an example of the age group table 121. As shown in FIG. 4, the age group table 121 describes an age group and a first average registration time in association with each other. The age group is divided into, for example, 10's (10 years old to 19 years old) and 20's (20 years old to 29 years old) according to the age of the customer. The age group is set freely. The first average registration time is an average purchase registration time required for the customer in the associated age group to execute the purchase registration operation. The first average registration time is, for example, an average purchase registration time based on an average registration time for a first point and an average registration time for second and subsequent points. The average registration time for a first point is, for example, an average purchase registration time required from a time point at which the first purchase registration screen is displayed on the touch panel 31 of the self-service POS terminal 10 to a time point at which the object recognition of the purchased merchandise is successful or a time point at which the barcode recognition is successful. The first purchase registration screen will be described later. The object recognition is recognition of the purchased merchandise by object recognition (generic object recognition) based on an image obtained by imaging an appearance of the purchased merchandise held over the reading window 32 of the scanner 17. The object recognition can also be referred to as a first registration operation method for recognizing and registering the image of the purchased merchandise. The barcode recognition is recognition of the purchased merchandise by imaging the purchased merchandise held over the reading window 32 and reading a barcode attached to the purchased merchandise. Each merchandise sold in the store is provided with a code symbol of a barcode system representing the merchandise code. The merchandise code is merchandise identification information set for each merchandise in order to individually identify the merchandise. The merchandise code is an example of identification information of the purchased merchandise. The barcode recognition can also be referred to as a second registration operation method for recognizing and registering the identification information of the purchased merchandise. The average registration time for second and subsequent points is, for example, an average purchase registration time required from a time point at which the object recognition of the previous purchased merchandise is successful or a time point at which the barcode recognition is successful to a time point at which the object recognition of the next purchased merchandise is successful or a time point at which the barcode recognition is successful. The average registration time for a first point and the average registration time for second and subsequent points are calculated by analyzing, for example, the past purchase registration time for each age group of the customer. As the first average registration time, for example, a time may be set in consideration of a fact that a customer in an age group called an elderly person or a child is not familiar with the purchase registration operation in many cases. The first average registration time is an example of a time related to the registration operation on the purchased merchandise. The age group table 121 is not limited to the data of the items described above.

The description returns to FIG. 3.

The face image memory 122 stores a frame image (imaged image) including a face of the customer imaged by the camera 311. The merchandise image memory 123 stores the frame image including the purchased merchandise imaged by the scanner 17. The merchandise image memory 123 stores the frame image used for the object recognition. The frame image stored in the merchandise image memory 123 is used, for example, when learning related to object recognition is executed. The average registration time memory 124 stores the first average registration time or the second average registration time. The second average registration time will be described later. The actual registration time memory 125 stores an actual registration time. The actual registration time is a purchase registration time required for the customer to actually execute the purchase registration operation. In the case of the purchased merchandise for a first point, the actual registration time is, for example, a purchase registration time required from a time point at which the first purchase registration screen is displayed on the touch panel 31 of the self-service POS terminal 10 to a time point at which the object recognition of the purchased merchandise is successful or a time point at which the barcode recognition is successful. In the case of the purchased merchandise for second and subsequent points, the actual registration time is, for example, a purchase registration time required from a time point at which the object recognition of the previous purchased merchandise is successful or a time point at which the barcode recognition is successful to a time point at which the object recognition of the next purchased merchandise is successful or a time point at which the barcode recognition is successful. The actual registration time may be measured as, for example, a time during which the purchase registration is executed. A timing of measuring the actual registration time is not limited to the above, and may be designed or set as any timing.

In the self-service POS terminal 10 having such a configuration, a part of a storage region of the auxiliary storage device 13 is set as a region of an age dictionary file 131. The age dictionary file 131 stores an age data record in which typical attribute data related to a human face corresponding to the age group is stored. The age data record includes items such as age group and face attribute data. The face attribute data is obtained by quantifying feature data of an attribute of the face. The face attribute is, for example, a hairstyle, a skin state, an eye, a wrinkle state of a mouth, presence or absence of a whisker, or presence or absence of a makeup. A storage destination of the age dictionary file 131 is not limited to the auxiliary storage device 13. The age dictionary file 131 may be stored in a part of the volatile memory region of the main memory 12, or may be stored in a storage device externally attached to the self-service POS terminal 10.

The processor 11 has functions as a first acquisition unit 111, a second acquisition unit 112, and a switching unit 113. The first acquisition unit 111 is a function of acquiring user information of the user who executes the registration operation on the purchased merchandise. The first acquisition unit 111 is sometimes referred to as a first acquirer, or first acquisition engine.

The second acquisition unit 112 is a function of acquiring a time related to the registration operation on the purchased merchandise based on the user information acquired by the first acquisition unit 111. The second acquisition unit 112 is sometimes referred to as a second acquirer, or second acquisition engine.

The switching unit 113 is a function of switching a registration operation method on the purchased merchandise when the time (e.g., a second time value, or time period) required for the registration operation on the purchased merchandise performed by the user passes or otherwise exceeds the time (e.g., a first time value, or time period) related to the registration operation on the purchased merchandise acquired by the second acquisition unit 112. The switching unit 113 is sometimes referred to as a switcher, or switching engine.

Figure 5:
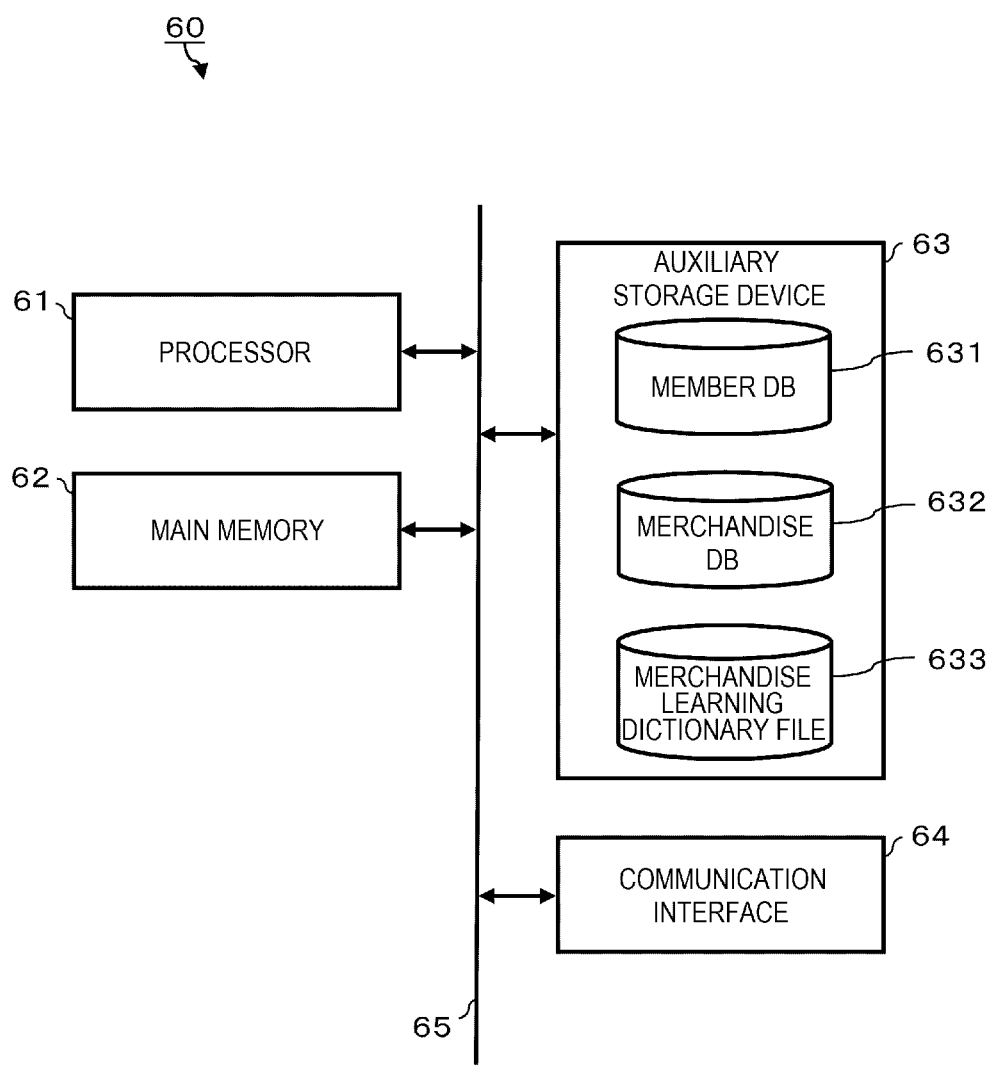
FIG. 5 is a block diagram showing a main part circuit configuration of a store server.

FIG. 5 is a block diagram showing a main part circuit configuration of the store server 60. As shown in FIG. 5, the store server 60 includes a processor 61, a main memory 62, an auxiliary storage device 63, a communication interface 64, and a system transmission path 65. The system transmission path 65 includes an address bus, a data bus, a control signal line, and the like. In the store server 60, the processor 61, the main memory 62, the auxiliary storage device 63, and the communication interface 64 are connected to the system transmission path 65. In the store server 60, a computer is constituted by the processor 61, the main memory 62, the auxiliary storage device 63, and the system transmission path 65 connecting the processor 61, the main memory 62, and the auxiliary storage device 63.

The processor 61 corresponds to a central part of the above-described computer. The processor 61 controls each unit as a control unit to implement various functions of the store server 60 according to an operating system or an application program stored in the main memory 62 or the auxiliary storage device 63. In the present embodiment, it is assumed that the processor 61 executes various types of processing as the control unit. The processor 61 is, for example, a CPU.

The main memory 62 corresponds to a main storage portion of the above-described computer. The main memory 62 includes a non-volatile memory region and a volatile memory region. The main memory 62 stores the operating system or the application program in the non-volatile memory region. The main memory 62 may store, in the non-volatile or volatile memory region, data necessary for the processor 61 to execute processing for controlling each unit. The main memory 62 uses the volatile memory region as a work area in which the data is appropriately rewritten by the processor 61. The non-volatile memory region is, for example, a ROM. The volatile memory region is, for example, a RAM.

The auxiliary storage device 63 corresponds to an auxiliary storage portion of the above-described computer. For example, the EEPROM, the HDD, or the SSD can be used as the auxiliary storage device 63. The auxiliary storage device 63 stores data used when the processor 61 executes various types of processing, data created by processing in the processor 61, and the like. The auxiliary storage device 63 may store the above-described application program.

The communication interface 64 executes data communication with the self-service POS terminal 10 connected via the communication network 1 according to the preset communication protocol.

In the store server 60 having such a configuration, a part of the storage region of the auxiliary storage device 63 is a region of a member database 631, a merchandise database 632, and a merchandise learning dictionary file 633. A storage destination of the member database 631, the merchandise database 632, and the merchandise learning dictionary file 633 is not limited to the auxiliary storage device 63. The member database 631, the merchandise database 632, and the merchandise learning dictionary file 633 may be stored in a part of the volatile memory region of the main memory 62, or may be stored in a storage device externally attached to the store server 60.

The member database 631 stores a member data record 6311 (see FIG. 6) in which member data is described for each member.

Figure 6:
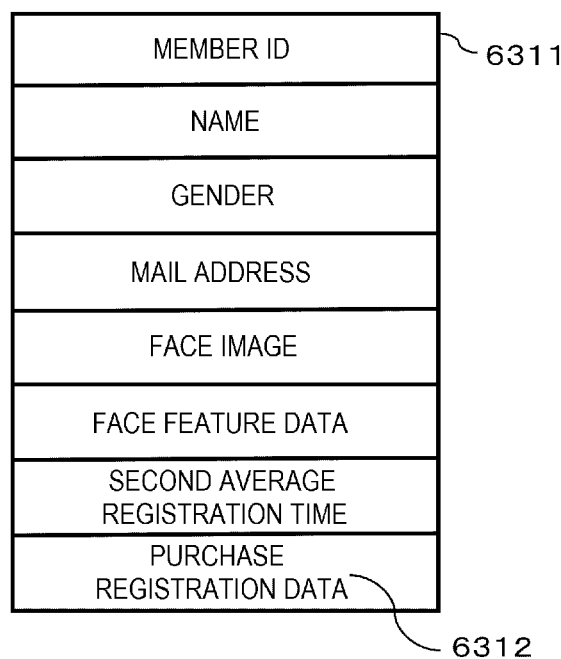
FIG. 6 is a schematic diagram showing a data structure of a member data record stored in a member database.

FIG. 6 is a schematic diagram showing a data structure of the member data record 6311 stored in the member database 631. As shown in FIG. 6, the member data record 6311 includes items such as a member ID, a name, a gender, a mail address, a face image, face feature data, the second average registration time, and purchase registration data 6312 (see FIG. 7). The member ID is member identification information set for each member in order to individually identify the member. The face image is a face image of a member imaged in advance. The face feature data is obtained by quantifying feature data indicating a relative position of a characteristic part (for example, a feature point such as an eye, a nose, or a mouth) of a face based on the face image of the member. The second average registration time is an average purchase registration time required for each member to execute the registration operation on the purchased merchandise. The second average registration time may be, for example, an average value of actual registration times described in the purchase registration data 6312, or may be a value obtained by adding a slight margin to the average value. The second average registration time is calculated when a predetermined number or more of actual registration times are described in the purchase registration data 6312. The predetermined number is, for example, 100 or 200. The predetermined number is set freely. The second average registration time may be updated as appropriate. When the actual registration time described in the purchase registration data 6312 does not satisfy the predetermined number, a NULL value is set to the second average registration time. The second average registration time is an example of the time related to the registration operation on the purchased merchandise. The member data record 6311 is not limited to the data of the items described above.

FIG. 7 is a schematic diagram showing an example of the purchase registration data 6312. As shown in FIG. 7, the purchase registration data 6312 includes, in order of a series of numbers, a transaction date and time, and a merchandise code, a merchandise name, a price, an actual registration time, and the like of the purchased merchandise purchased by the user. The transaction date and time will be described later. In the case of the registration operation based on the object recognition, the actual registration time describes the purchase registration time required for the customer to actually execute the registration operation by the object recognition. In the case of the registration operation based on the barcode recognition, the actual registration time describes the purchase registration time required for the customer to actually execute the registration operation by the barcode recognition. The purchase registration data 6312 is not limited to the data of the items described above.

The merchandise database 632 stores a merchandise data record in which data of the merchandise sold in the store is recorded. The merchandise data record includes items such as a merchandise code, a merchandise name, a price, and first merchandise feature data. The first merchandise feature data is obtained by quantifying feature data of a standard appearance of the merchandise such as a shape, a surface hue, a pattern, and a concave-convex state of the merchandise for each merchandise. The merchandise data record is not limited to the data of the items described above.

The merchandise learning dictionary file 633 stores a learning data record in which data related to the purchased merchandise imaged by the scanner 17 is recorded. The merchandise learning dictionary file 633 is used when learning is executed for increasing a recognition rate of an object during the object recognition. The learning data record includes items such as a merchandise code, a merchandise image, and second merchandise feature data. The merchandise image is a frame image including the purchased merchandise imaged by the scanner 17. The second merchandise feature data is obtained by quantifying the feature data such as the shape, the surface hue, the pattern, and the concave-convex state of the merchandise read from the merchandise image. For example, when the feature data cannot be read from the merchandise image, a NULL value is set as the second merchandise feature data. The learning data record is not limited to the data of the items described above.

Figure 13:
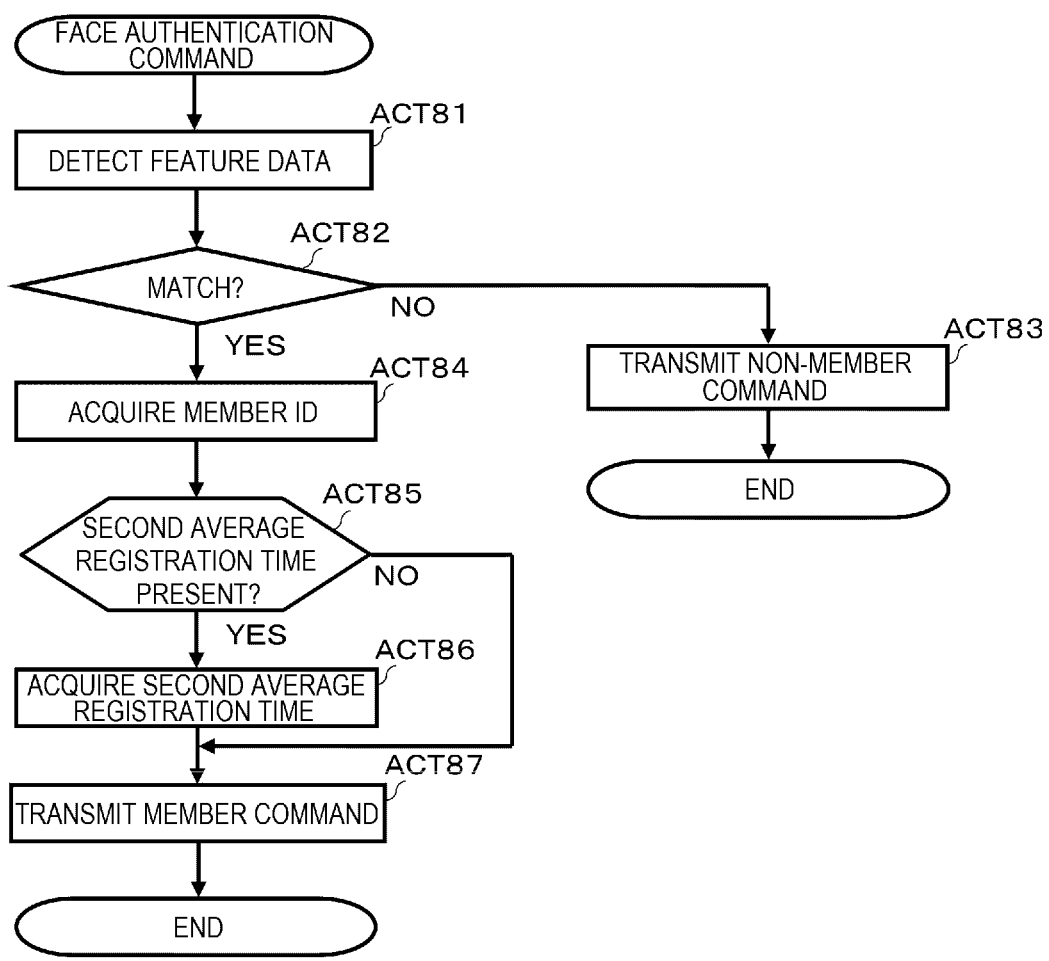
FIG. 13 is a flowchart showing a main part control procedure of a processor in the store server.
Figure 14:
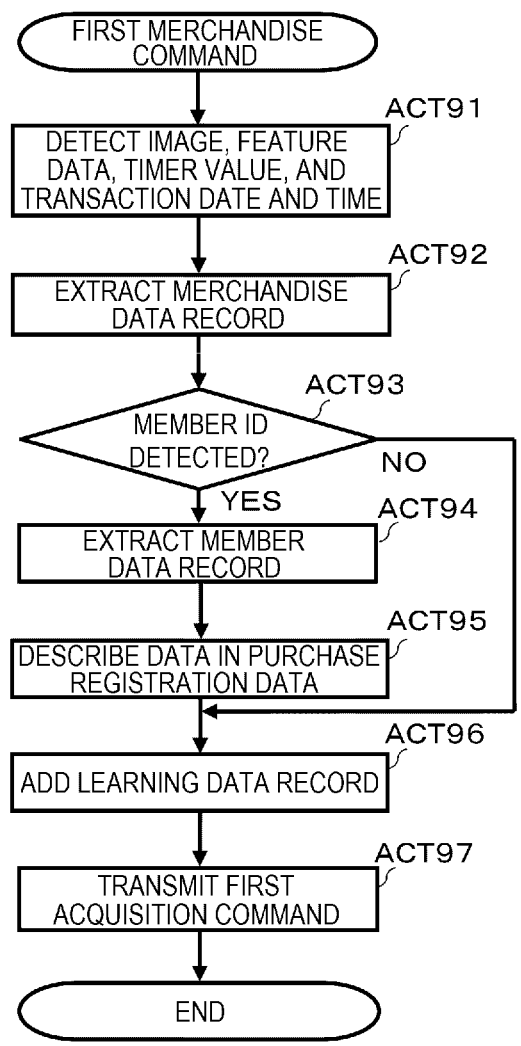
FIG. 14 is a flowchart.
Figure 15:
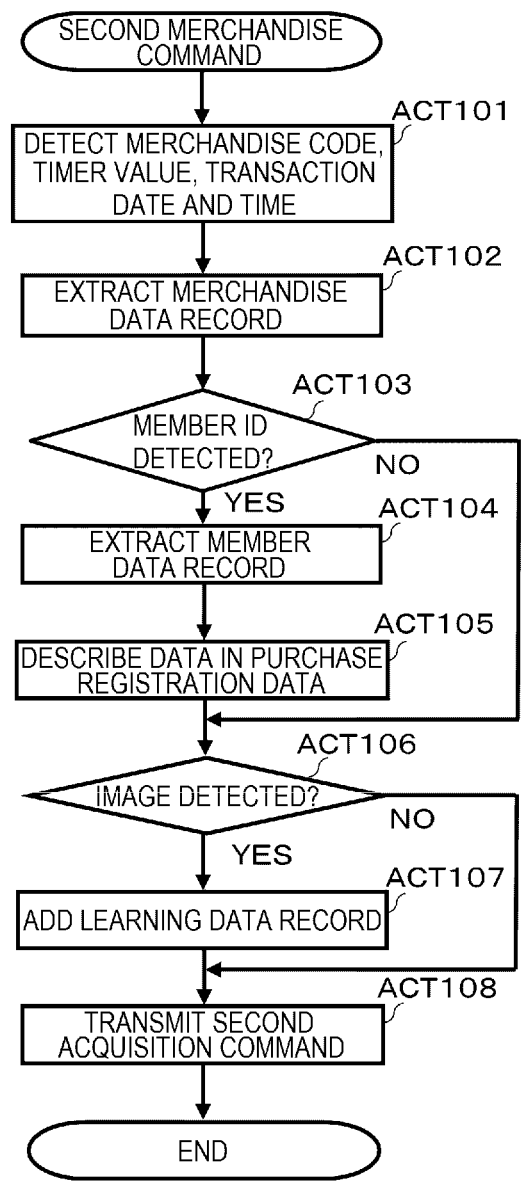
FIG. 15 is a flowchart.

FIGS. 8 to 12 are flowcharts showing a main part control procedure of the processor 11 (control unit) in the self-service POS terminal 10. FIGS. 13 to 15 are flowcharts showing a main part control procedure of the processor 61 (control unit) in the store server 60. Hereinafter, with reference to the flowcharts, a main act of the information processing system S when the customer executes the registration to the settlement for the purchased merchandise by the self-service using the self-service POS terminal 10 will be described. The act described below is an example. The procedure is not particularly limited as long as a similar result is obtained.

First, a customer who comes to an accounting site for accounting stands in front of the empty self-service POS terminal 10 and places a basket containing the purchased merchandises on the basket table 50. On the other hand, for example, when the customer stands in front of the self-service POS terminal 10 by the motion sensor 21, the self-service POS terminal 10 starts information processing of a procedure shown in the flowchart in FIG. 8 on an assumption that the customer is detected.

In ACT 1, the processor 11 outputs an imaging ON signal to the camera 311. In response to the imaging ON signal, the camera 311 images the face of the customer standing in front of the self-service POS terminal 10. In ACT 2, the processor 11 captures a frame image including the face of the customer imaged by the camera 311. In ACT 3, the processor 11 stores the frame image including the face of the customer in the face image memory 122 of the main memory 12.

In ACT 4, the processor 11 executes face recognition on the frame image. As the face recognition, the processor 11 calculates, for example, feature data on the face of the customer included in the frame image. The processor 11 acquires the feature data on the face of the customer calculated by the function of the first acquisition unit 111. The feature data on the face of the customer is an example of the user information. Since such a technique of the face recognition is well known, a detailed description thereof will be omitted.

In ACT 5, the processor 11 controls the communication interface 15 to transmit a face authentication command to the store server 60. By the control, the communication interface transmits the face authentication command. The face authentication command includes the feature data acquired in the face recognition in ACT 4.

The processor 61 of the store server 60 that receives the face authentication command starts command reception of a procedure shown in the flowchart in FIG. 13.

In ACT 81, the processor 61 detects feature data from the face authentication command. In ACT 82, the processor 61 checks whether the member data record 6311 including the face feature data matching the feature data detected in the processing in ACT 81 is present in the member database 631. At this time, when a degree of similarity between the feature data detected in the processing in ACT 81 and the face feature data is equal to or greater than a predetermined value, the processor 61 considers both pieces of feature data as matching.

When the corresponding member data record 6311 is not present in the member database 631, the processor 61 determines NO in ACT 82 and proceeds to ACT 83. The case in which the member data record 6311 is not present in the member database 631 means, for example, a case in which the customer is a non-member. In ACT 83, the processor 61 controls the communication interface 64 to transmit a non-member command to the self-service POS terminal 10. By the control, the non-member command is transmitted from the communication interface 64. The non-member command is received by the self-service POS terminal 10 via the communication network 1.

When the corresponding member data record 6311 is present in the member database 631, the processor 61 determines YES in ACT 82 and proceeds to ACT 84. In ACT 84, the processor 61 acquires a member ID included in the member data record 6311.

In ACT 85, the processor 61 checks whether the second average registration time is stored in the corresponding member data record 6311.

When the second average registration time is stored, the processor 61 determines YES in ACT 85 and proceeds to ACT 86. In ACT 86, the processor 61 acquires the second average registration time. Then, the processor 61 proceeds to ACT 87.

When the second average registration time is not stored, that is, when the NULL value is set to the second average registration time, the processor 61 determines NO in ACT 85, skips the processing in ACT 86, and proceeds to ACT 87.

In ACT 87, the processor 61 controls the communication interface 64 to transmit a member command to the self-service POS terminal 10. By the control, the member command is transmitted from the communication interface 64. The member command is received by the self-service POS terminal 10 via the communication network 1. When the second average registration time is acquired in the processing in ACT 86, the member ID and the second average registration time are included in the member command. When the second average registration time is not stored in the member data record 6311, the member ID is included in the member command.

In this manner, the store server 60 which receives the face authentication command transmits the non-member or the member command in ACT 83 or ACT 87 to the self-service POS terminal 10 which is a transmission source of the face authentication command. When the transmission of any one of the commands is completed, the processor 61 ends the face authentication command reception.

Figure 8:
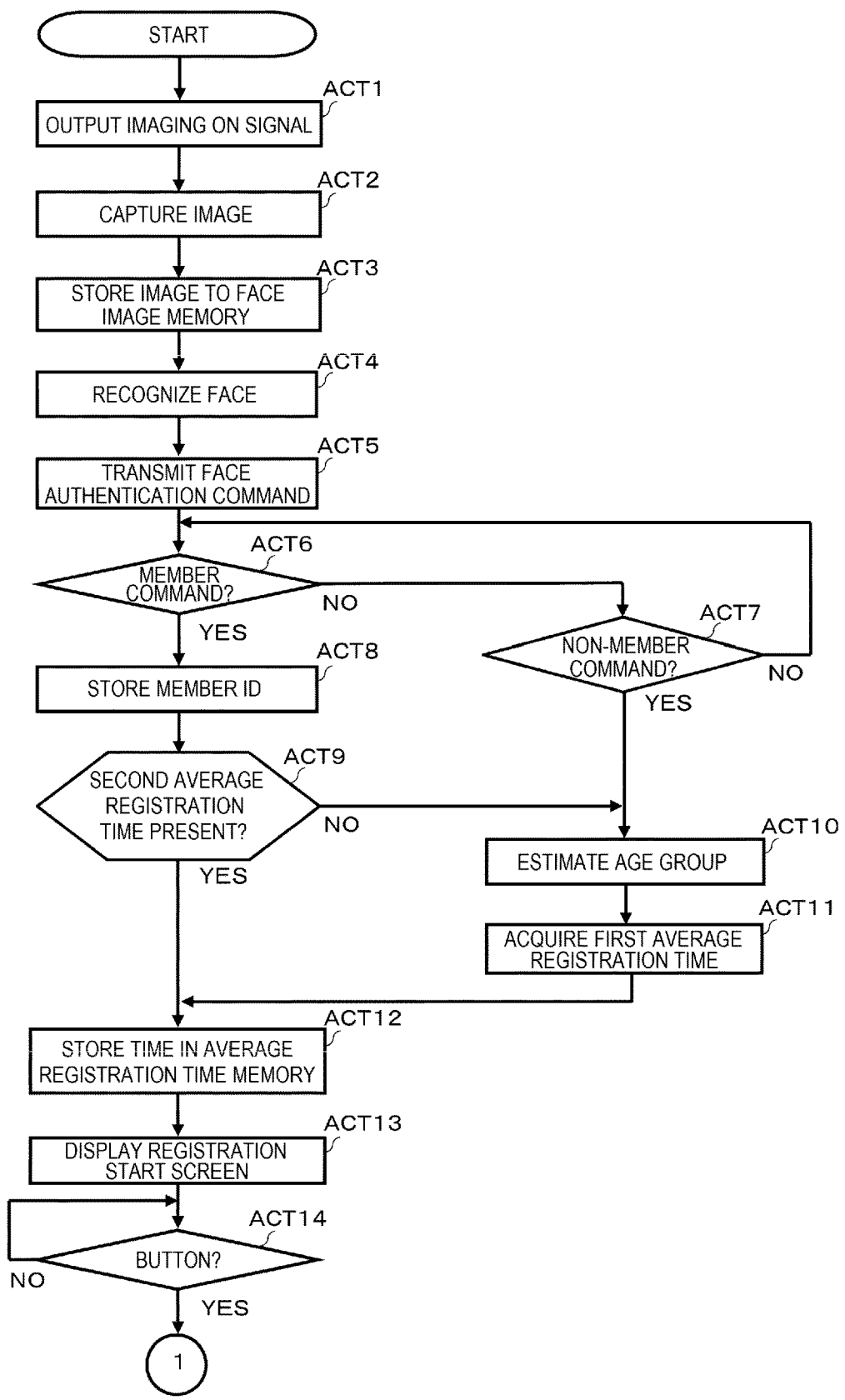
FIG. 8 is a flowchart showing a main part control procedure of a processor in the self-service POS terminal.

The description returns to FIG. 8.

In ACT 6, the processor 11 of the self-service POS terminal 10 that controls the transmission of the face authentication command in ACT 5 waits for the member command from the store server 60.

When the member command is not received from the store server 60, the processor 11 determines NO in ACT 6 and proceeds to ACT 7.

In ACT 7, the processor 11 checks whether the non-member command is received. When the non-member command is not received, the processor 11 determines NO in ACT 7 and returns to the processing in ACT 6. That is, the processor 11 returns to a waiting state in ACT 6 and ACT 7.

When the processor 11 receives the member command from the store server 60 in the waiting state in ACT 6 and ACT 7, the processor 11 determines YES in ACT 6 and proceeds to ACT 8. In ACT 8, the processor 11 stores, in the main memory 12, the member ID included in the member command.

In ACT 9, the processor 11 checks whether the second average registration time is included in the member command. When the second average registration time is included in the member command, the processor 11 determines YES in ACT 9 and proceeds to ACT 12. In ACT 12, the processor 11 stores the second average registration time in the average registration time memory 124 by the function of the second acquisition unit 112.

When the second average registration time is not included in the member command, the processor 11 determines NO in ACT 9 and proceeds to ACT 10.

When the non-member command is received from the store server 60 in the waiting state in ACT 6 and ACT 7, the processor 11 determines YES in ACT 7 and proceeds to ACT 10. As described above, when the second average registration time is not included in the received member command or when the non-member command is received, the processor 11 proceeds to ACT 10.

In ACT 10, the processor 11 executes age group estimation on the frame image including the face of the customer stored in the face image memory 122.

As the age group estimation, the processor 11 extracts, for example, an attribute of the face of the customer included in the frame image. The processor 11 digitizes the extracted attribute and extracts an age data record including the face attribute data having a highest degree of similarity to the digitized attribute from the age dictionary file 131. The processor 11 acquires the age group associated with the face attribute data by the function of the first acquisition unit 111. The age group is an example of the user information. Since a technique of such age group estimation is well known, a detailed description thereof will be omitted.

In ACT 11, the processor 11 refers to the age group table 121 and acquires the first average registration time associated with the age group acquired in the age group estimation in ACT 10. That is, in the case of a customer whose second average registration time is not stored in the member data record 6311 or a customer who is a non-member, the processor 11 estimates the age group of the customer and acquires the first average registration time. Then, the processor 11 proceeds to ACT 12. In ACT 12, in this case, the processor 11 stores the first average registration time in the average registration time memory 124 by the function of the second acquisition unit 112.

In ACT 13, the processor 11 displays a registration start screen on the touch panel 31. The registration start screen is, for example, a screen that allows the customer to select, for example, whether to use the plastic shopping bag provided in the store or to use my-bag. The registration start screen displays an image of a plastic shopping bag button for the customer to designate a use of the plastic shopping bag and an image of a my-bag button for the customer to designate a use of the my-bag. When the customer who checks the registration start screen uses the plastic shopping bag, the customer causes the holding arm 43 to hold the plastic shopping bag and touches the plastic shopping bag button. When using the my-bag, the customer causes the holding arm 43 to hold the my-bag and touches the my-bag button.

In ACT 14, the processor 11 waits for the plastic shopping bag button or the my-bag button to be touched. When the plastic shopping bag button or the my-bag button is touched, the processor 11 determines YES in ACT 14 and proceeds to ACT 21 in FIG. 9.

In ACT 21, the processor 11 displays the first purchase registration screen 100 (see FIG. 16) on the touch panel 31.

Figure 16:
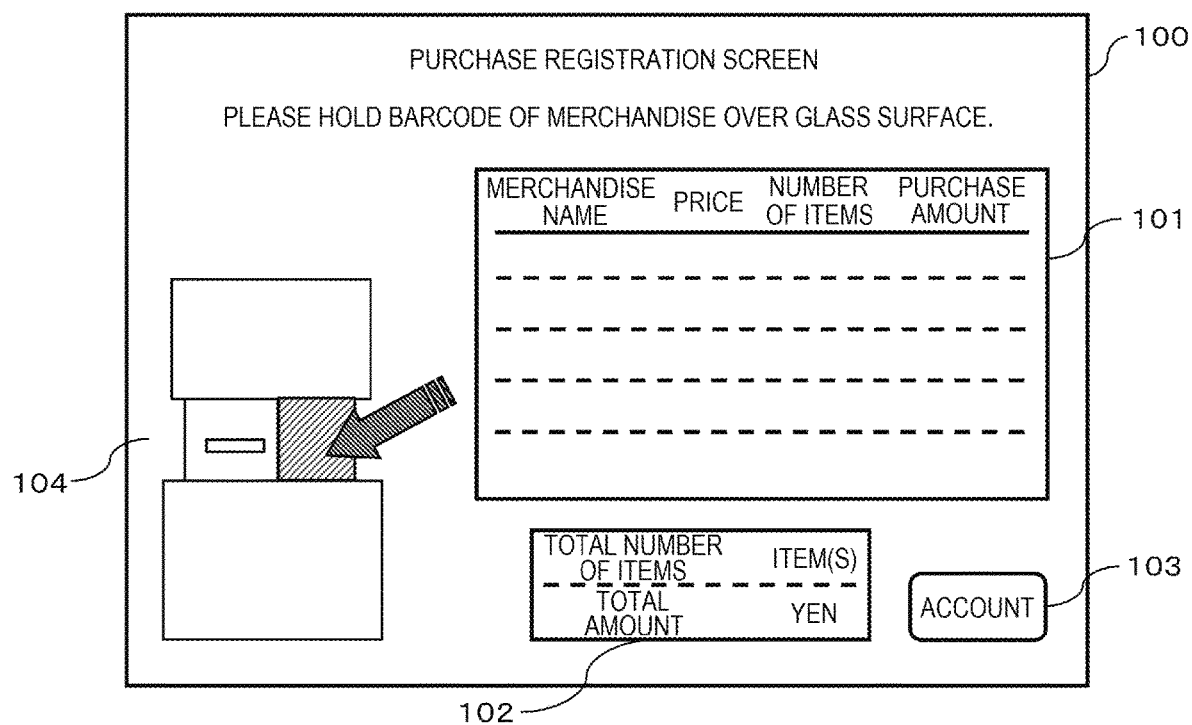
FIG. 16 is a schematic diagram showing an example of a first purchase registration screen.

FIG. 16 is a schematic diagram showing an example of the first purchase registration screen 100. As shown in FIG. 16, the first purchase registration screen 100 displays an image of a detail field 101 that displays a detail of the merchandise registered for purchase, a total field 102 that displays a total number of items and a total amount of the merchandise registered for purchase, and an accounting button 103 for instructing accounting. The detail field 101 includes a merchandise name, a price, the number of items, and a purchase amount of the merchandise. The number of items is a purchase number of the merchandises identified by the merchandise code. The purchase amount is an amount obtained by multiplying prices by the number of items. The first purchase registration screen 100 displays a message that prompts the customer to hold the purchased merchandise over a glass surface, that is, the reading window 32 of the scanner 17, and a guide image 104 that guides the customer to hold the purchased merchandise over the reading window 32. That is, the guide image 104 is an image that guides the registration operation method by the object recognition. A content and an image of text data displayed in FIG. 16 are examples.

The customer who checks the first purchase registration screen 100 executes the registration operation by the object recognition. That is, the customer takes out the purchased merchandises one by one from the basket placed on the basket table 50. Then, the purchased merchandises are held over the reading window 32.

Figure 9:
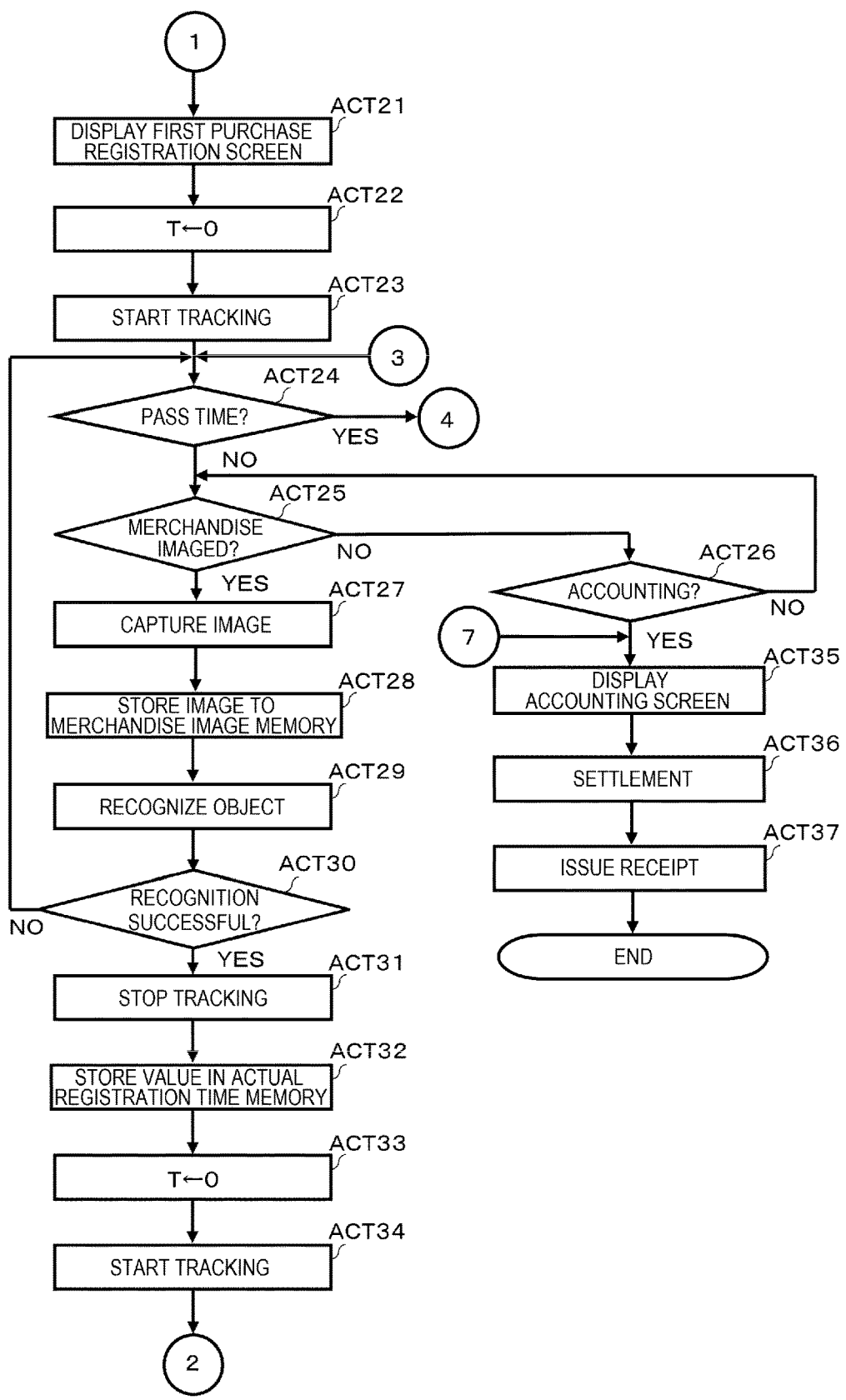
FIG. 9 is a flowchart.

The description returns to FIG. 9.

In ACT 22, the processor 11 resets a timer value T of the timer counter 20 to "0". In ACT 23, the processor 11 starts tracking by the timer counter 20.

In ACT 24, the processor 11 checks whether the timer value T passes a time stored in the average registration time memory 124. Specifically, when the first average registration time is stored in the average registration time memory 124, the processor 11 checks whether the timer value T passes the first average registration time. When the second average registration time is stored in the average registration time memory 124, the processor 11 checks whether the timer value T passes the second average registration time.

Figure 11:
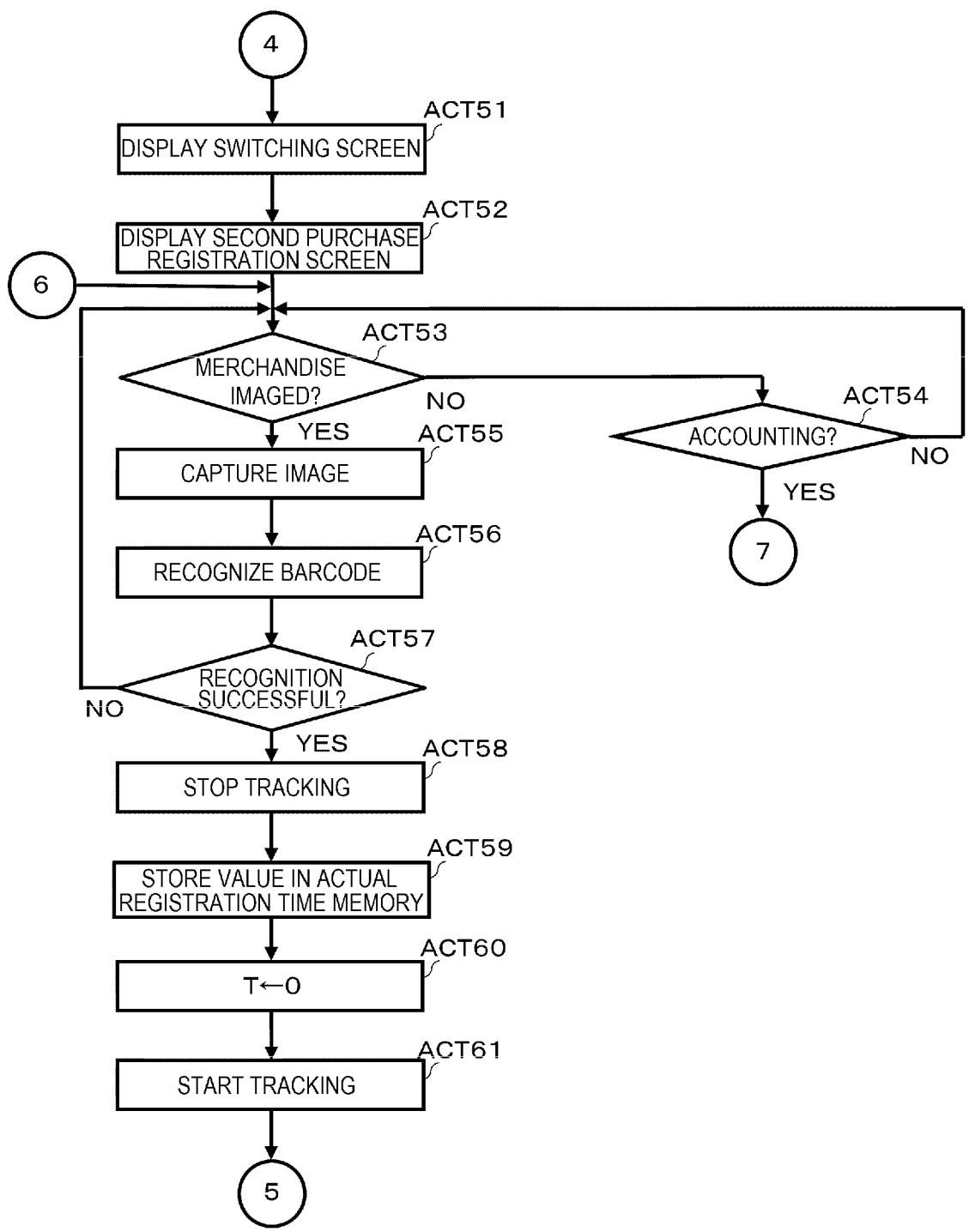
FIG. 11 is a flowchart.

When the timer value T passes the time stored in the average registration time memory 124, the processor 11 determines YES in ACT 24 and proceeds to ACT 51 in FIG. 11. The processing in ACT 51 will be described later.

When the timer value T does not pass the time stored in the average registration time memory 124, the processor 11 determines NO in ACT 24 and proceeds to ACT 25. In ACT 25, the processor 11 waits for the scanner 17 to image the purchased merchandise.

When the purchased merchandise is not imaged, the processor 11 determines NO in ACT 25 and proceeds to ACT 26.

The processor 11 checks whether the accounting is instructed in ACT 26. As described above, an image of the accounting button 103 is displayed in apart of the first purchase registration screen 100. The customer who completes the purchase registration touches the accounting button 103. When the accounting button 103 is touched, the processor 11 recognizes that the accounting is instructed. When the accounting is not instructed, the processor 11 determines NO in ACT 26 and returns to the processing in ACT 25. That is, the processor 11 returns to the waiting state in ACT 25 and ACT 26.

When the processor 11 images the purchased merchandise in the waiting state in ACT 25 and ACT 26, the processor 11 determines YES in ACT 25 and proceeds to ACT 27.

In ACT 27, the processor 11 captures a frame image including the purchased merchandise imaged by the scanner 17. In ACT 28, the processor 11 stores the frame image including the purchased merchandise in the merchandise image memory 123.

In ACT 29, the processor 11 executes the object recognition on the frame image. As the object recognition, the processor 11 detects presence or absence of a skin color region based on, for example, the frame image. When the skin color region is detected, that is, when reflection of a hand of the customer is detected, the processor 11 extracts a contour line or the like from an image obtained by binarizing the frame image. Accordingly, the processor 11 attempts to extract a contour of the purchased merchandise assumed to be held by the hand of the customer. When the contour of the purchased merchandise is extracted, the processor 11 reads feature data, that is, second merchandise feature data, such as a shape, a surface hue, a pattern, and a concave-convex state of the purchased merchandise from the image in the contour. When the second merchandise feature data is read, the processor 11 considers that the purchased merchandise is recognized. That is, the processor 11 considers that the object recognition is successful. When the second merchandise feature data cannot be read, the processor 11 considers that the purchased merchandise is not recognized. That is, the processor 11 considers that the object recognition fails. The case in which the second merchandise feature data cannot be read means, for example, a case in which the contour of the purchased merchandise cannot be extracted due to a large reflection of the hand of the customer holding the purchased merchandise. Since a technique for recognizing an object included in such an image is well known, a detailed description thereof will be omitted.

In ACT 30, the processor 11 checks whether the object recognition is successful. When the object recognition fails, the processor 11 determines NO in ACT 30 and returns to the processing in ACT 24. Then, the processor 11 repeats the processing from ACT 24 to ACT 30 in the same manner as described above.

When the object recognition is successful, the processor 11 determines YES in ACT 30 and proceeds to ACT 31. In ACT 31, the processor 11 stops the tracking executed by the timer counter 20.

In ACT 32, the processor 11 stores the timer value T tracked by the timer counter 20 in the actual registration time memory 125.

In ACT 33, the processor 11 resets the timer value T of the timer counter 20 to "0". In ACT 34, the processor 11 starts tracking by the timer counter 20.

Figure 10:
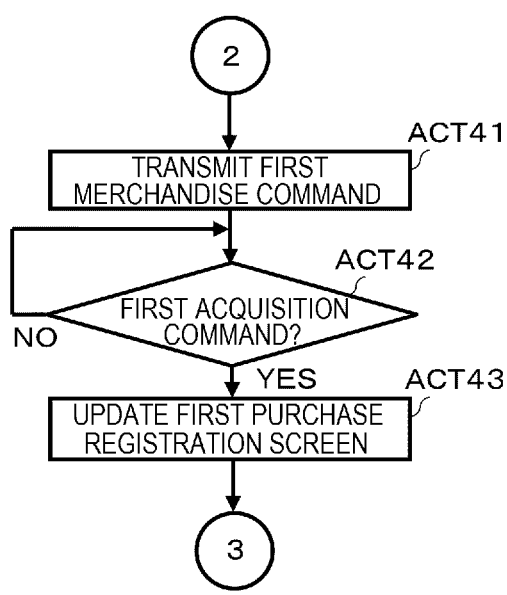
FIG. 10 is a flowchart.

In ACT 41 in FIG. 10, the processor 11 controls the communication interface 15 to transmit a first merchandise command to the store server 60. By the control, the communication interface 15 transmits the first merchandise command. The first merchandise command includes image data of the frame image including the purchased merchandise stored in the merchandise image memory 123 in the processing in ACT 28, the second merchandise feature data read in the object recognition in ACT 29, the timer value T stored in the actual registration time memory 125 in the processing in ACT 32, and the transaction date and time. The transaction date and time is a date and time tracked by the clock 14 at a transmission start time point of the first merchandise command. When the member ID is stored in the main memory 12, the first merchandise command includes the image data of the frame image, the second merchandise feature data, the timer value T, the transaction date and time, and the member ID.

The processor 61 of the store server 60 that receives the first merchandise command starts the command reception of the procedure shown in the flowchart in FIG. 14.

In ACT 91, the processor 61 detects, from the first merchandise command, the frame image including the purchased merchandise, the second merchandise feature data, the timer value T, and the transaction date and time. In ACT 92, the processor 61 extracts, from the merchandise database 632, a merchandise data record including the first merchandise feature data having the highest degree of similarity to the second merchandise feature data detected in the processing in ACT 91.

In ACT 93, the processor 61 checks whether the member ID is detected from the first merchandise command. When the member ID is detected, the processor 61 determines YES in ACT 93 and proceeds to ACT 94. In ACT 94, the processor 61 extracts the member data record 6311 including the member ID from the member database 631.

In ACT 95, the processor 61 describes data in the purchase registration data 6312 included in the member data record 6311. Specifically, the processor 61 describes, in the purchase registration data 6312, the transaction date and time detected in the processing in ACT 91, the timer value T detected in the processing in ACT 91 as the actual registration time, and the merchandise code, the merchandise name, and the price included in the merchandise data record extracted in the processing in ACT 92 in association with one another. Then, the processor 61 proceeds to ACT 96.

When the member ID is not detected, the processor 61 determines NO in ACT 93, skips the processing in ACT 94 and ACT 95, and proceeds to ACT 96.

In ACT 96, the processor 61 adds learning data record to the merchandise learning dictionary file 633. Specifically, the processor 61 stores, in the merchandise learning dictionary file 633, the frame image detected in the processing in ACT 91 as the merchandise image, the second merchandise feature data detected in the processing in ACT 91, and the merchandise code included in the merchandise data record extracted in the processing in ACT 92 in association with one another.

In ACT 97, the processor 61 controls the communication interface 24 to transmit a first acquisition command to the self-service POS terminal 10. By the control, the first acquisition command is transmitted from the communication interface 24. The first acquisition command is received by the self-service POS terminal 10 via the communication network 1. The first acquisition command includes the merchandise data record extracted in the processing in ACT 92.

The description returns to FIG. 10.

In ACT 42, the processor 11 of the self-service POS terminal 10 that controls the transmission of the first merchandise command in ACT 41 waits for the first acquisition command from the store server 60. When the first acquisition command is received from the store server 60, the processor 11 determines YES in ACT 42 and proceeds to ACT 43.

In ACT 43, the processor 11 updates the first purchase registration screen 100 based on the merchandise data record included in the first acquisition command. That is, the processor 11 updates the first purchase registration screen 100 such that the merchandise name, the price, the number of items, and the purchase amount of the merchandise registered for purchase are added and that the number of items and the purchase amount are added to the total number of items and the total amount. Then, the processor 11 returns to ACT 24 in FIG. 9. That is, the processor 11 checks whether the timer value T serving as the time required for the registration operation on the next purchased merchandise passes the time stored in the average registration time memory 124.

When the accounting is instructed in the waiting state in ACT 25 and ACT 26, the processor 11 determines YES in ACT 26 and proceeds to ACT 35. In ACT 35, the processor 11 displays an accounting screen on the touch panel 31. The accounting screen displays, for example, the total amount of the merchandises registered for purchase.

In ACT 36, the processor 11 executes settlement. Since the settlement is well known, a detailed description thereof will be omitted. In ACT 37, the processor 11 controls the printer 18 to issue a receipt from the receipt issuing port 34. The customer receives the receipt issued from the receipt issuing port 34, and leaves the store while holding the plastic shopping bag or the my-bag removed from the holding arm 43. As described above, the processor 11 ends the information processing of the procedure shown in the flowcharts in FIGS. 8 to 10.

When the timer value T passes the time stored in the average registration time memory 124, the processor 11 determines YES in ACT 24. The processor 11 switches from the object recognition to the barcode recognition when the time required for the registration operation on the purchased merchandise executed by the user by the function of the switching unit 113, that is, the timer value T, passes the time related to the registration operation on the purchased merchandise acquired by the second acquisition unit 112, that is, the time stored in the average registration time memory 124. Then, the processor 11 proceeds to ACT 51 in FIG. 11.

Figure 17:
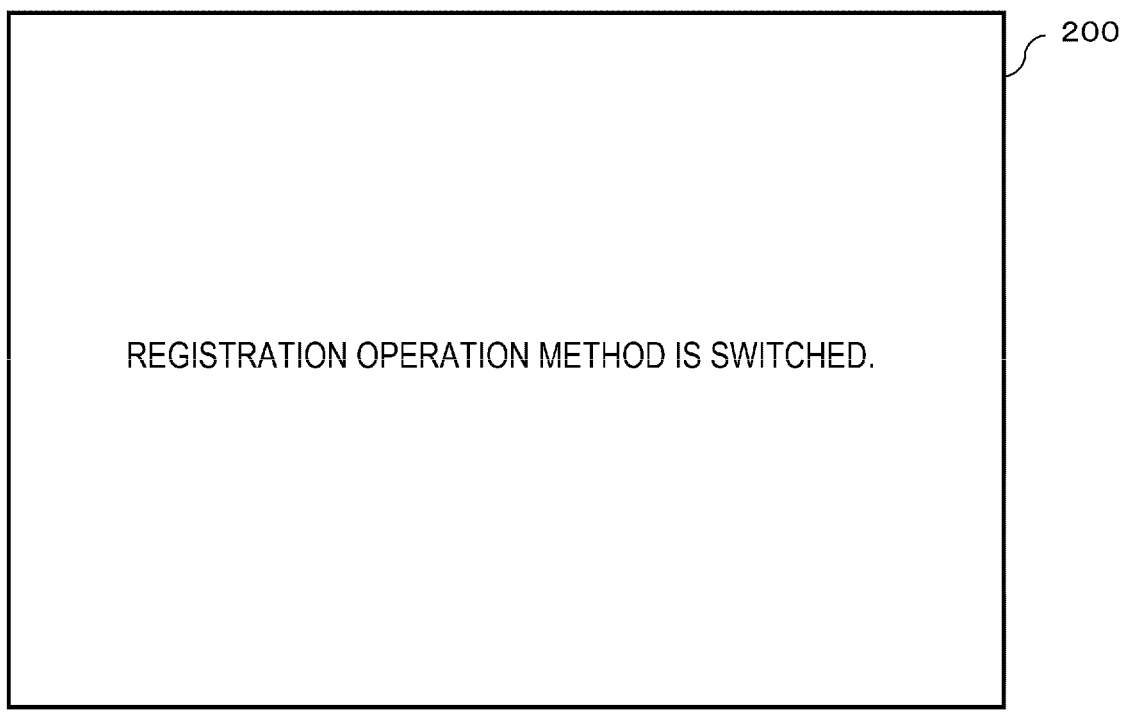
FIG. 17 is a schematic diagram showing an example of a switching screen.

In ACT 51, the processor 11 causes the touch panel 31 to display a switching screen 200 (see FIG. 17).

FIG. 17 is a schematic diagram showing an example of the switching screen 200. As shown in FIG. 17, a message for notifying the customer that the registration operation method is switched is displayed on the switching screen 200. The switching screen 200 disappears after a certain period of time. A content of text data displayed in FIG. 17 is an example.

The description returns to FIG. 11.

In ACT 52, the processor 11 displays a second purchase registration screen 300 (see FIG. 18) on the touch panel 31.

Figure 18:
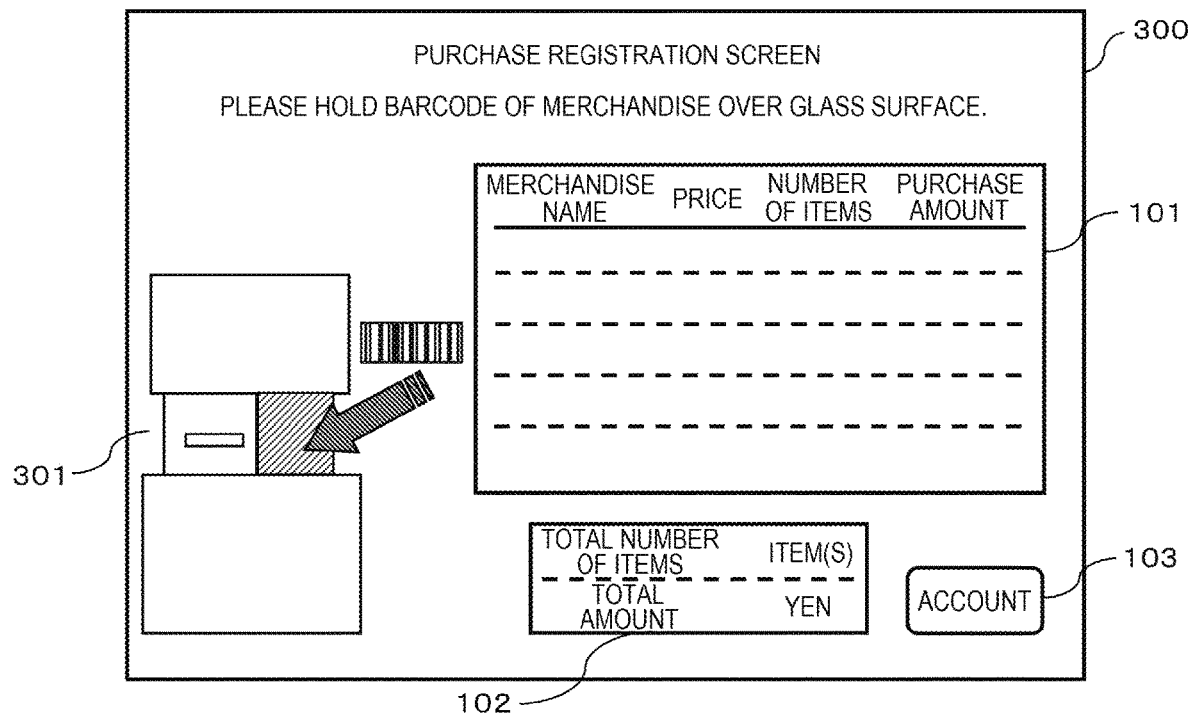
FIG. 18 is a schematic diagram showing an example of a second purchase registration screen.

FIG. 18 is a schematic diagram showing an example of the second purchase registration screen 300. As shown in FIG. 18, the second purchase registration screen 300 displays an image of the detail field 101 that displays a detail of the merchandise registered for purchase, the total field 102 that displays a total number of items and a total amount of the merchandise registered for purchase, and the accounting button 103 for instructing accounting. The second purchase registration screen 300 displays a message prompting the customer to hold the barcode of the purchased merchandise over the glass surface, that is, the reading window 32 of the scanner 17, and a guide image 301 that guides the customer to hold the barcode of the purchased merchandise over the reading window 32. That is, the guide image 301 is an image that guides the registration operation method by the barcode recognition. A content and an image of text data that are displayed in FIG. 18 are examples.

After the switching screen 200 is displayed, the customer who checks the second purchase registration screen 300 executes the registration operation by the barcode recognition. That is, the customer holds the barcode of the purchased merchandise over the reading window 32.

The description returns to FIG. 11.

In ACT 53, the processor 11 waits for the scanner 17 to image the purchased merchandise to which the barcode is attached.

When the purchased merchandise is not imaged, the processor 11 determines NO in ACT 53 and proceeds to ACT 54.

The processor 11 checks whether the accounting is instructed in ACT 54. When the accounting is not instructed, the processor 11 determines NO in ACT 54 and returns to the processing in ACT 53. That is, the processor 11 returns to the waiting state in ACT 53 and ACT 54.

When the processor 11 images the purchased merchandise in the waiting state in ACT 53 and ACT 54, the processor 11 determines YES in ACT 53 and proceeds to ACT 55. In ACT 55, the processor 11 captures a frame image including the purchased merchandise imaged by the scanner 17.

In ACT 56, the processor 11 executes the barcode recognition on the frame image. As the barcode recognition, the processor 11 analyzes, for example, the frame image and detects the barcode attached to the purchased merchandise. The processor 11 reads binary code information, that is, a merchandise code from the barcode. When the merchandise code is read, the processor 11 considers that the purchased merchandise is recognized. That is, the processor 11 considers that the barcode recognition is successful. When the merchandise code cannot be read, the processor 11 considers that the purchased merchandise is recognized. That is, the processor 11 considers that the barcode recognition fails. The case in which the merchandise code cannot be read means, for example, a case in which the barcode is distorted since the purchased merchandise to which the barcode is attached is recessed, or a case in which the barcode cannot be detected since a discount seal or the like is attached to a barcode portion attached to the purchased merchandise. Since the barcode recognition technique based on such image analysis is well known, a detailed description thereof will be omitted.

In ACT 57, the processor 11 checks whether the barcode recognition is successful. When the barcode recognition fails, the processor 11 determines NO in ACT 57 and returns to the processing in ACT 53. Then, the processor 11 repeats the processing from ACT 53 to ACT 57 in the same manner as described above.

When the barcode recognition is successful, the processor 11 determines YES in ACT 57 and proceeds to ACT 58. In ACT 58, the processor 11 stops the tracking executed by the timer counter 20. In ACT 59, the processor 11 stores the timer value T tracked by the timer counter 20 in the actual registration time memory 125.

In ACT 60, the processor 11 resets the timer value T of the timer counter 20 to "0". In ACT 61, the processor 11 starts tracking by the timer counter 20.

Figure 12:
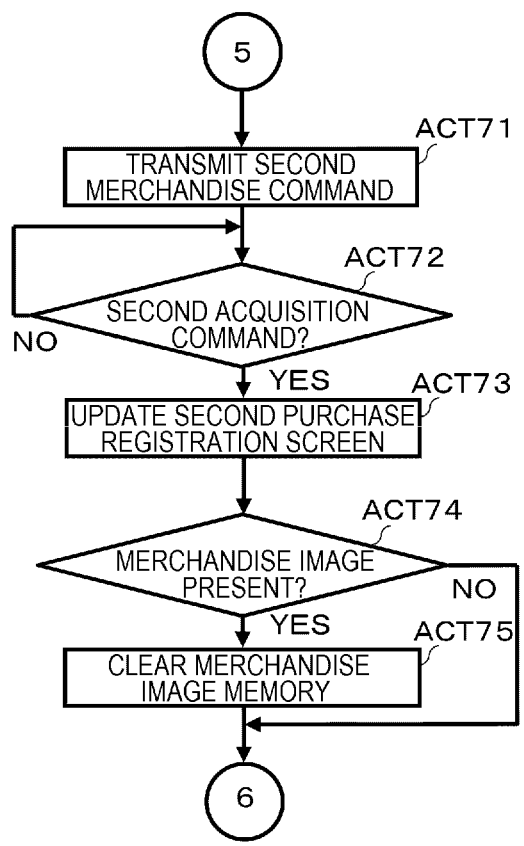
FIG. 12 is a flowchart.

In ACT 71 in FIG. 12, the processor 11 controls the communication interface 15 to transmit a second merchandise command to the store server 60. By the control, the communication interface 15 transmits the second merchandise command. The second merchandise command includes the merchandise code read in the barcode recognition in ACT 56, the timer value T stored in the actual registration time memory 125 in the processing in ACT 59, and the transaction date and time. The transaction date and time is a date and time tracked by the clock 14 at a transmission start time point of the second merchandise command. When the member ID is stored in the main memory 12, the second merchandise command includes the merchandise code, the timer value T, the transaction date and time, and the member ID. When the frame image including the purchased merchandise is stored in the merchandise image memory 123, the second merchandise command further includes the frame image. The case in which the frame image including the purchased merchandise is stored in the merchandise image memory 123 means that, when the object recognition is not successful within the first average registration time or the second average registration time stored in the average registration time memory 124, the frame image including the purchased merchandise for which the object recognition is failed is stored in the merchandise image memory 123.

The processor 61 of the store server 60 that receives the second merchandise command starts the command reception of the procedure shown in the flowchart in FIG. 15.

In ACT 101, the processor 61 detects the merchandise code, the timer value T, and the transaction date and time from the second merchandise command. In ACT 102, the processor 61 extracts, from the merchandise database 632, a merchandise data record including the merchandise code detected in the processing in ACT 101.

In ACT 103, the processor 61 checks whether the member ID is detected from the second merchandise command. When the member ID is detected, the processor 61 determines YES in ACT 103 and proceeds to ACT 104. In ACT 104, the processor 61 extracts the member data record 6311 including the member ID from the member database 631.

In ACT 105, the processor 61 describes data in the purchase registration data 6312 included in the member data record 6311. Specifically, the processor 61 describes, in ACT 102 in the purchase registration data 6312, the merchandise code and the transaction date and time that are detected in the processing in ACT 101, the timer value T detected in the processing in ACT 101 as the actual registration time, and the merchandise name and the price that are included in the merchandise data record extracted in the processing in association with one another. Then, the processor 61 proceeds to ACT 106.

When the member ID is not detected, the processor 61 determines NO in ACT 103, skips the processing in ACT 104 and ACT 105, and proceeds to ACT 106.

In ACT 106, the processor 61 checks whether the frame image including the purchased merchandise is detected from the second merchandise command. When the frame image is detected, the processor 61 determines YES in ACT 106 and proceeds to ACT 107.

In ACT 107, the processor 61 adds learning data record to the merchandise learning dictionary file 633. Specifically, the processor 61 stores the merchandise code and the frame image detected in the processing in ACT 106 as the merchandise image in association with each other. A NULL value is set to the second merchandise feature data. Then, the processor 61 proceeds to ACT 108.

When the frame image is not detected, the processor 61 determines NO in ACT 106, skips the processing in ACT 107, and proceeds to ACT 108.

In ACT 108, the processor 61 controls the communication interface 64 to transmit a second acquisition command to the self-service POS terminal 10. By the control, the second acquisition command is transmitted from the communication interface 64. The second acquisition command is received by the self-service POS terminal 10 via the communication network 1. The second acquisition command includes the merchandise data record extracted in the processing in ACT 102.

The description returns to FIG. 12.

In ACT 72, the processor 11 of the self-service POS terminal 10 that controls the transmission of the second merchandise command in ACT 71 waits for the second acquisition command from the store server 60. When the second acquisition command is received from the store server 60, the processor 11 determines YES in ACT 72 and proceeds to ACT 73.

In ACT 73, the processor 11 updates the second purchase registration screen 300 based on the merchandise data record included in the second acquisition command.

In ACT 74, the processor 11 checks whether the frame image including the purchased merchandise is stored in the merchandise image memory 123. When the frame image is stored in the merchandise image memory 123, YES is determined in ACT 74, and the processing proceeds to ACT 75.

In ACT 75, the processor 11 clears the merchandise image memory 123. Then, the processor 11 returns to ACT 53 in FIG. 11. That is, when the registration operation method based on the object recognition is switched to the registration operation method based on the barcode recognition, the subsequent registration operation on the purchased merchandise is executed based on the barcode recognition.

When the accounting is instructed in the waiting state in ACT 53 and ACT 54, the processor 11 determines YES in ACT 54 and proceeds to ACT 35 in FIG. 9. Then, the processor 11 executes the processing from ACT 35 to ACT 37 in the same manner as described above. According to the above, the processor 11 ends the information processing of the procedure shown in the flowcharts in FIGS. 8 to 12.

Therefore, in the information processing system S, when the camera 311 images the face of the customer standing in front of the self-service POS terminal 10, the face recognition is executed on the frame image. When the face authentication command including the feature data acquired by the face recognition is transmitted from the self-service POS terminal 10 to the store server 60, the store server 60 checks whether the member data record 6311 including the face feature data matching the feature data is present in the member database 631, checks whether the second average registration time is stored when the member data record 6311 is present, and transmits the member or non-member command. When the non-member command or the member command not including the second average registration time is received by the self-service POS terminal 10, the age group estimation is executed, and the first average registration time, which is an average time required for the customer in the estimated age group to execute the registration operation, is acquired. When the member command including the second average registration time is received by the self-service POS terminal 10, the second average registration time, which is an average time required for the customer to execute the registration operation, is acquired. Then, after the registration start screen is displayed on the touch panel 31, the first purchase registration screen 100 is displayed. The customer executes the registration operation by the object recognition. Here, when the object recognition is not successful within the first average registration time or the second average registration time stored in the average registration time memory 124, the registration operation method based on the object recognition is switched to the registration operation method based on the barcode recognition. That is, the switching screen 200 is displayed on the touch panel 31, and the second purchase registration screen 300 is displayed. Thereafter, the customer executes the registration operation based on the barcode recognition.

Since the registration operation based on the object recognition is executed only by holding the appearance of the purchased merchandise over the reading window 32 of the scanner 17, it is possible to attain an effect that the time required for the purchase registration is shorter than the time required for the registration operation based on the barcode recognition in which the barcode of the purchased merchandise is held over the reading window 32. Even when the registration operation based on the object recognition is not successful due to a large reflection of the hand of the customer holding the purchased merchandise or the like, since the registration operation method is switched to the registration operation method based on the barcode recognition, the customer does not need to execute the registration operation by the object recognition over a long time while being confused. Therefore, it is possible to reduce stress caused by the customer himself or herself executing the registration operation on the purchased merchandise. The registration operation method is switched based on the average purchase registration time (second average registration time) of the customer himself or herself or the average purchase registration time (first average registration time) of the customer in the estimated age group. Therefore, it is possible to execute the registration operation on the purchased merchandise by the self-service POS terminal 10 according to the customer.

Second Embodiment

Next, a second embodiment will be described with reference to FIGS. 19 to 23.

The second embodiment is different from the first embodiment in that the second purchase registration screen 300 is displayed after a registration start screen is displayed. The second embodiment is different from the first embodiment in that the first purchase registration screen 100 is displayed after the switching screen 200 is displayed when barcode recognition is not successful within a first average registration time or a second average registration time stored in the average registration time memory 124. In the drawings and the following description of the second embodiment, the same elements as the first embodiment are denoted by the same reference numerals. Therefore, description of the same elements may be omitted. Incidentally, FIGS. 1 to 8, 13, 14, and 16 to 18 used in the description of the first embodiment are common to the second embodiment, and thus the description thereof will be omitted here.

FIGS. 19 to 22 are flowcharts showing a main part control procedure executed by the processor 11 (control unit) of the self-service POS terminal 10 according to a control method in the second embodiment. FIG. 23 is a flowchart showing a main part control procedure executed by the processor 61 (control unit) of the store server 60 according to the control method in the second embodiment. FIGS. 19, 20, 21, 22, and 23 correspond to FIGS. 9, 10, 11, 12, and 15 described in the first embodiment, respectively. Therefore, the same processing acts as the first embodiment are denoted by the same reference numerals. A content of the act described below is an example. The act procedure and the content thereof are not particularly limited as long as similar results can be obtained.

Figure 19:
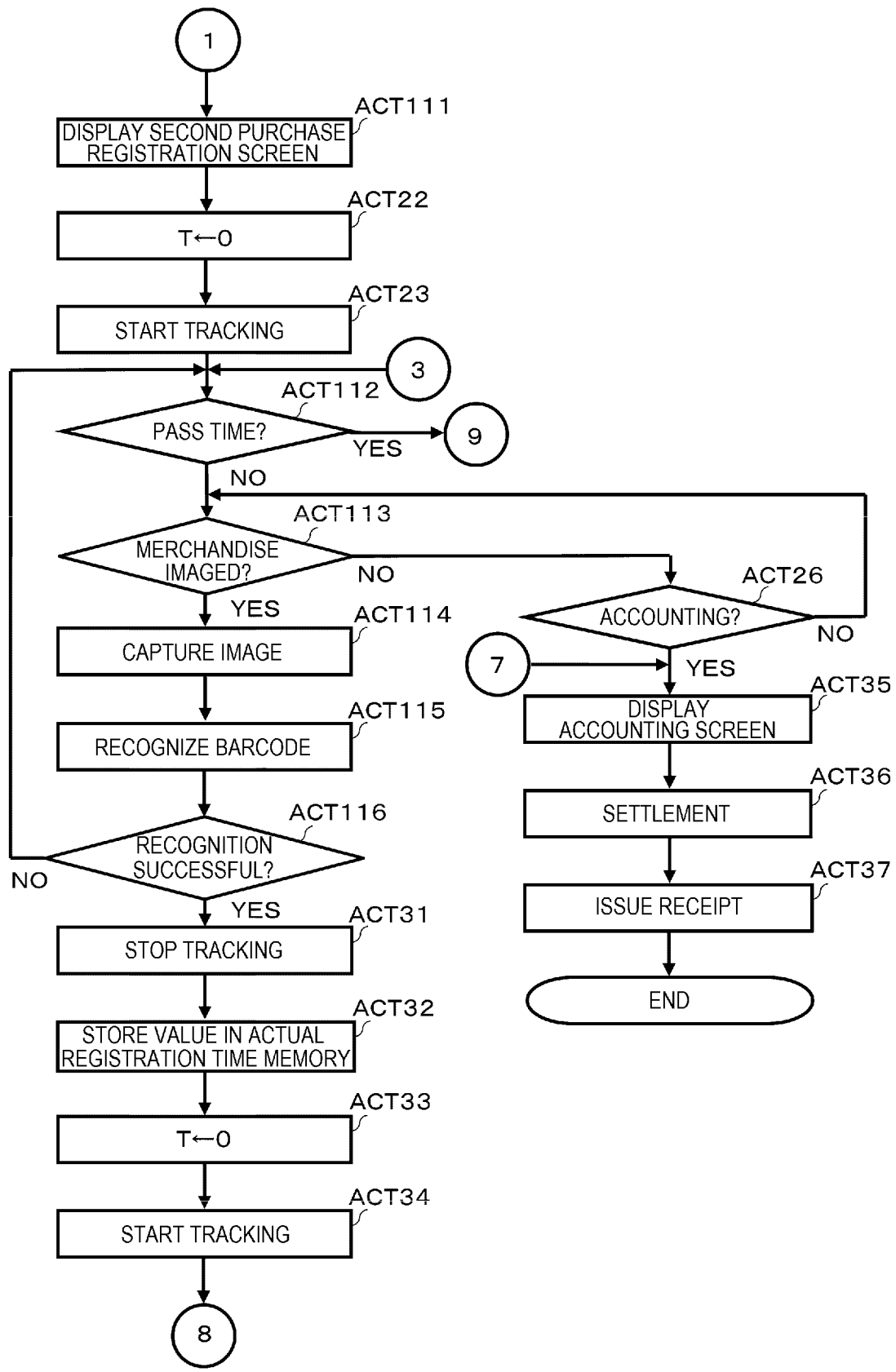
FIG. 19 is a flowchart showing a main part control procedure of a processor in a self-service POS terminal according to a second embodiment.

As can be seen from a comparison between FIG. 19 and FIG. 9, in the second embodiment, in ACT 111, when a plastic shopping bag button or a my-bag button of a purchase start screen is touched, the processor 11 displays the second purchase registration screen 300 on the touch panel 31.

In the second embodiment, the processing from ACT 112 to ACT 116 is executed after the processing in ACT 23.

In ACT 112, the processor 11 checks whether the timer value T passes the first average registration time or the second average registration time stored in the average registration time memory 124. When the timer value T does not pass the time stored in the average registration time memory 124, the processor 11 determines NO in ACT 112 and proceeds to ACT 113.

The processing from ACT 113 to ACT 116 is the same as the processing from ACT 53 and ACT 55 to ACT 57 according to the first embodiment. That is, in ACT 113, the processor 11 waits for the scanner 17 to image the purchased merchandise to which the barcode is attached or to instruct the accounting. When the processor 11 images the purchased merchandise in the waiting state in ACT 113 and ACT 26, the processor 11 determines YES in ACT 113 and proceeds to ACT 114. In ACT 114, the processor 11 captures a frame image including the purchased merchandise imaged by the scanner 17. In ACT 115, the processor 11 executes the barcode recognition on the frame image. In ACT 116, the processor 11 checks whether the barcode recognition is successful. When the barcode recognition fails, the processor 11 determines NO in ACT 116 and returns to the processing in ACT 112. Then, the processor 11 repeats the processing from ACT 112 to ACT 116 and ACT 26 in the same manner as described above. When the barcode recognition is successful, the processor 11 determines YES in ACT 116 and proceeds to ACT 30. The processor 11 executes the processing from ACT 30 to ACT 34 in the same manner as in the first embodiment.

Figure 20:
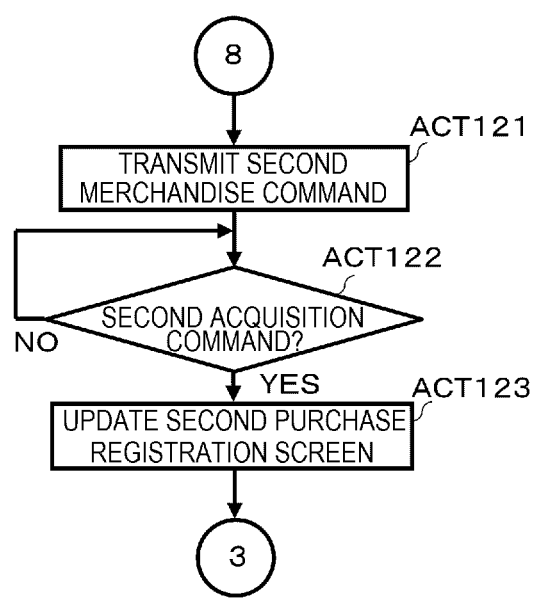
FIG. 20 is a flowchart.

In the second embodiment, the processing from ACT 121 to ACT 123 in FIG. 20 is executed after the processing in ACT 34.

In ACT 121, the processor 11 controls the communication interface 15 to transmit the second merchandise command to the store server 60. By the control, the communication interface 15 transmits the second merchandise command. The second merchandise command includes the merchandise code read in the barcode recognition in ACT 115, the timer value T stored in the actual registration time memory 125 in the processing in ACT 32, and the transaction date and time. The transaction date and time is a date and time tracked by the clock 14 at a transmission start time point of the second merchandise command. When the member ID is stored in the main memory 12, the second merchandise command includes the merchandise code, the timer value T, the transaction date and time, and the member ID.

The processor 61 of the store server 60 that receives the second merchandise command starts the command reception of the procedure shown in the flowchart in FIG. 23.

As can be seen from the comparison between FIG. 23 and FIG. 15, the second embodiment is different from the first embodiment in that the processor 61 of the store server 60 omits the processing in ACT 106 and ACT 107. In the processing in ACT 107, a learning data record is added to the merchandise learning dictionary file 633 in the frame image used for the object recognition. Therefore, the frame image used in the barcode recognition is not stored in the merchandise image memory 123, and the frame image is not included in the second merchandise command.

The description returns to FIG. 20.

In ACT 122, the processor 11 of the self-service POS terminal 10 that controls the transmission of the second merchandise command in ACT 121 waits for the second acquisition command from the store server 60. When the second acquisition command is received from the store server 60, the processor 11 determines YES in ACT 122 and proceeds to ACT 123.

In ACT 123, the processor 11 updates the second purchase registration screen 300 based on the merchandise data record included in the second acquisition command. Then, the processor 11 returns to ACT 112 in FIG. 19. That is, the processor 11 checks whether the timer value T serving as the time required for the registration operation on the next purchased merchandise passes the time stored in the average registration time memory 124.

When the timer value T passes the time stored in the average registration time memory 124, the processor 11 determines YES in ACT 112. The processor 11 switches from the barcode recognition to the object recognition when the time required for the registration operation on the purchased merchandise executed by the user by the function of the switching unit 113, that is, the timer value T, passes the time related to the registration operation on the purchased merchandise acquired by the second acquisition unit 112, that is, the time stored in the average registration time memory 124. Then, the processor 11 proceeds to ACT 51 in FIG. 21.

Figure 21:
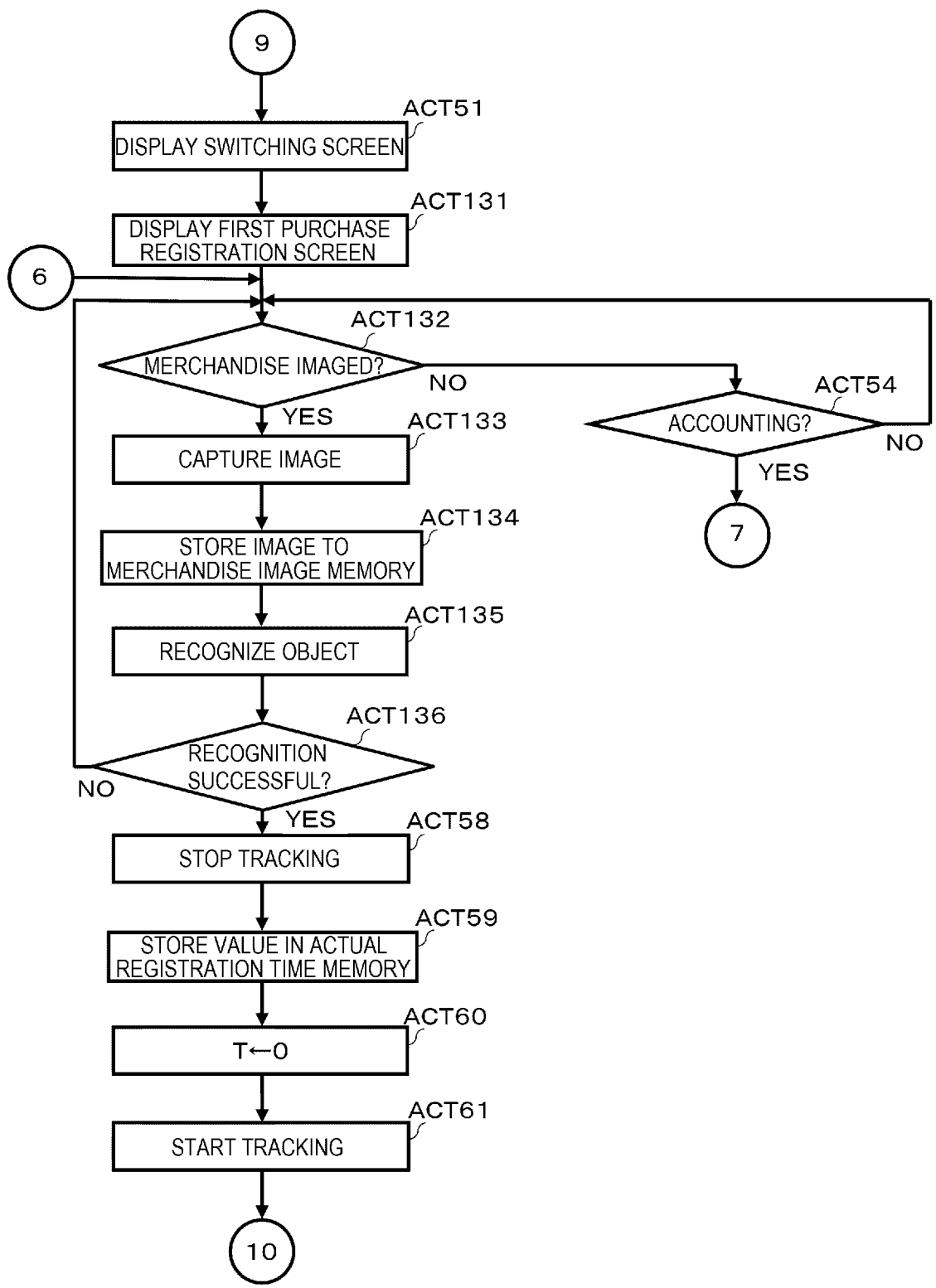
FIG. 21 is a flowchart.

As can be seen from the comparison between FIG. 21 and FIG. 11, in the second embodiment, the processor 11 executes the processing from ACT 131 to ACT 136 after the processing in ACT 51.

In ACT 131, the processor 11 displays the first purchase registration screen 100 on the touch panel 31.

The processing in ACT 132 to ACT 136 is the same as the processing in ACT 25 and ACT 27 to ACT 30 according to the first embodiment. That is, in ACT 132, the processor 11 waits for the scanner 17 to image the purchased merchandise or to instruct the accounting. When the processor 11 images the purchased merchandise in the waiting state in ACT 132 and ACT 54, the processor 11 determines YES in ACT 132 and proceeds to ACT 133. In ACT 133, the processor 11 captures a frame image including the purchased merchandise imaged by the scanner 17. In ACT 134, the processor 11 stores the frame image including the purchased merchandise in the merchandise image memory 123. In ACT 135, the processor 11 executes the object recognition on the frame image. In ACT 136, the processor 11 checks whether the object recognition is successful. When the object recognition fails, the processor 11 determines NO in ACT 136 and returns to the processing in ACT 132. Then, the processor 11 repeats the processing in ACT 132 to ACT 136 and ACT 54 in the same manner as described above. When the object recognition is successful, the processor 11 determines YES in ACT 136 and proceeds to ACT 58. The processor 11 executes the processing from ACT 58 to ACT 61 in the same manner as in the first embodiment.

Figure 22:
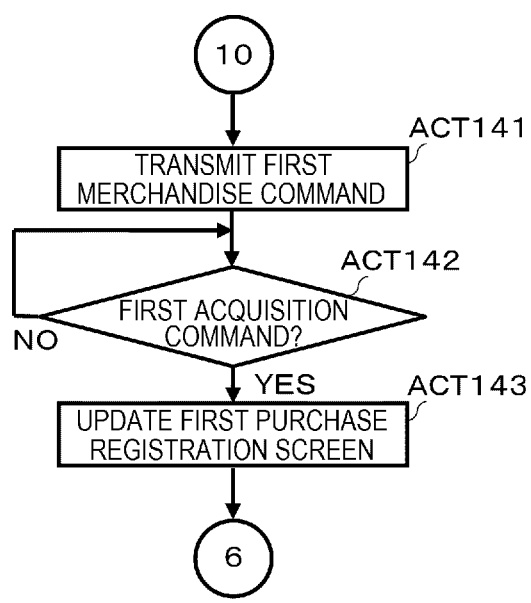
FIG. 22 is a flowchart.

In the second embodiment, the processing proceeds to ACT 141 in FIG. 22 after the processing in ACT 61.

As can be seen from a comparison between FIG. 22 and FIG. 12, the second embodiment is different from the first embodiment in that the processor 11 omits the processing in ACT 74 and ACT 75. Every time a frame image including a purchased merchandise imaged by the scanner 17 used in the object recognition is captured, the frame image is stored in the merchandise image memory 123. Then, the first merchandise command including the frame image is transmitted to the store server 60. Therefore, the processor 11 does not need to check whether the frame image is stored in the merchandise image memory 123 and to clear the merchandise image memory 123.

In ACT 141, the processor 11 controls the communication interface 15 to transmit the first merchandise command to the store server 60. By the control, the communication interface 15 transmits the first merchandise command. In ACT 142, the processor 11 waits for the first acquisition command from the store server 60. When the first acquisition command is received from the store server 60, the processor 11 determines YES in ACT 142 and proceeds to ACT 143. In ACT 143, the processor 11 updates the first purchase registration screen 100 based on the merchandise data record included in the first acquisition command. Then, the processor 11 returns to ACT 132 in FIG. 21. That is, when the registration operation method based on the barcode recognition is switched to the registration operation method based on the object recognition, the subsequent registration operation on the purchased merchandise is executed based on the object recognition.

As described above, in the second embodiment, the second purchase registration screen 300 is first displayed. The customer executes the registration operation by the barcode recognition. Here, when the barcode recognition is not successful within the first average registration time or the second average registration time stored in the average registration time memory 124, the registration operation method based on the barcode recognition is switched to the registration operation method based on the object recognition. That is, the switching screen 200 is displayed on the touch panel 31, and the first purchase registration screen 100 is displayed. Thereafter, the customer executes the registration operation based on the object recognition.

Since the barcode recognition specifies the purchased merchandise from the merchandise code represented by the barcode, an effect can be attained that the barcode recognition is more reliable than the object recognition in which the purchased merchandise is recognized from the feature data of the imaged purchased merchandise. Even when the registration operation based on the barcode recognition is not successful due to the reason that the barcode is distorted due to dent of the purchased merchandise or the like, the registration operation method is switched to the registration operation method based on the object recognition, and thus the customer does not need to execute the registration operation by the barcode recognition over a long period of time while being confused. Therefore, it is possible to reduce stress caused by the customer himself or herself executing the registration operation on the purchased merchandise. Similarly to the first embodiment, since the registration operation method is switched based on the first average registration time or the second average registration time, it is possible to execute the registration operation on the purchased merchandise by the self-service POS terminal 10 according to the customer.

Although the first embodiment and the second embodiment have been described above, the embodiment is not limited thereto.

In the above-described embodiments, each barcode system code symbol representing a merchandise code is attached to a respective one of merchandises sold in a store. For example, the code symbol may be a two-dimensional data code system.

In the above-described embodiments, in the barcode recognition, the purchased merchandise is recognized by imaging the purchased merchandise held over the reading window 32 of the scanner 17 and then reading the barcode attached to the purchased merchandise. For example, in the barcode recognition, a purchased merchandise may be recognized by optically reading a barcode using reflection of laser light.

In the above-described embodiments, the age group table 121 describes the age group and the first average registration time in association with each other. The age group table 121 may describe, for example, the age group, the gender, and the first average registration time in association with one another. In this case, the first average registration time may be calculated by analyzing a past purchase registration time based on, for example, a combination of the age group and the gender of the customer.

In the above-described embodiments, the merchandise data record includes items such as the merchandise code, the merchandise name, the price, and the first merchandise feature data. The merchandise data record may further include, for example, an image of the merchandise. The image of the merchandise is, for example, an image of a merchandise having a standard appearance.

In the above-described embodiments, the first average registration time is an average purchase registration time required for the customer in an associated age group to execute the purchase registration operation without distinguishing between the registration operation based on the object recognition and the registration operation based on the barcode recognition. For example, the first average registration time may be divided into a first average registration time for the object recognition and a first average registration time for the barcode recognition. The first average registration time for the object recognition is an average purchase registration time required for the customer in the associated age group to execute the purchase registration operation by the object recognition. The first average registration time for the barcode recognition is an average purchase registration time required for the customer in the associated age group to execute the purchase registration operation by the barcode recognition. In this case, the first average registration time for the object recognition may be used when the registration operation based on the object recognition is executed, and the first average registration time for the barcode recognition may be used when the registration operation based on the barcode recognition is executed.

In the above-described embodiments, in the case of the registration operation based on the object recognition, the actual registration time is described in the purchase registration data 6312 as the purchase registration time required for the customer to actually execute the registration operation based on the object recognition, and in the case of the registration operation based on the barcode recognition, the actual registration time is described in the purchase registration data 6312 as the purchase registration time required for the customer to actually execute the registration operation based on the barcode recognition.

For example, the purchase registration data 6312 may further include an item of information for identifying whether the operation is a registration operation based on the object recognition or a registration operation based on the barcode recognition. In this case, for example, the first merchandise command and the second merchandise command may include data for identifying whether the registration operation is the registration operation based on the object recognition or the registration operation based on the barcode recognition. For example, when the processor 61 of the store server 60 detects the merchandise code from the command received from the self-service POS terminal 10, the processor 61 may determine that the registration operation is the registration operation based on the barcode recognition, and when the merchandise code is not detected, the processor 61 may determine that the registration operation is the registration operation based on the object recognition, and set information in the purchase registration data 6312.

For example, the item of the actual registration time included in the purchase registration data 6312 may be divided into the item of the actual registration time for the object recognition and the item of the actual registration time for the barcode recognition. The actual registration time for the object recognition is a purchase registration time required for the customer to actually execute the purchase registration operation based on the object recognition. The actual registration time for the barcode recognition is a purchase registration time required for the customer to actually execute the purchase registration operation based on the barcode recognition.

In the above-described embodiments, the member data record 6311 includes the second average registration time. For example, the member data record 6311 may include a second average registration time for the object recognition and a second average registration time for the barcode recognition. The second average registration time for the object recognition may be, for example, an average value of the actual registration times described in the item of the actual registration time for the object recognition of the purchase registration data 6312 described above. When the actual registration time for the object recognition does not satisfy the predetermined number, a NULL value is set to the second average registration time for the object recognition. The second average registration time for the barcode recognition may be, for example, an average value of the actual registration times described in the item of the actual registration time for the barcode recognition of the purchase registration data 6312 described above. When the actual registration time for the barcode recognition does not satisfy the predetermined number, a NULL value is set to the second average registration time for the barcode recognition. For example, the predetermined number may be different between the object recognition and the barcode recognition, or may be the same.

In the above-described embodiments, the registration start screen is exemplified as a screen that allows the customer to select whether to use the plastic shopping bag provided in the store or to use the my-bag. For example, the registration start screen may be a screen that receives selection of a payment method. In this case, when the processor 11 receives the selection of the payment method, the processor 11 determines YES in ACT 14 in FIG. 8 and proceeds to ACT 21 in FIG. 9.

In the above-described embodiments, the processor 11 executes the face recognition on the frame image including the face of the customer imaged by the camera 311. For example, the processor 61 of the store server 60 or a processor of another server may execute the face recognition. In this case, the processor 11 may transmit a command including the image data of the frame image to the store server 60 or another server.

In the above-described embodiments, the switching screen 200 is displayed on the touch panel 31. For example, a message for notifying the customer that the registration operation method is switched may be displayed as a pop-up image on the first purchase registration screen 100 or the second purchase registration screen 300. The pop-up image disappears after a certain period of time. For example, the switching of the registration operation method may be output as a voice message.

In the above-described embodiments, the processor 11 displays the accounting screen on the touch panel 31 when the accounting is instructed. For example, when the accounting is instructed even though there is no merchandise registered for purchase, the processor 11 may display an error screen on the touch panel 31. The error screen may display, for example, an image of a "Yes" button for instructing the customer to check the message together with a message for notifying the customer that there is no merchandise registered for purchase.

In the above-described embodiments, the self-service POS terminal 10 is described as an aspect of the information processing device. For example, a terminal having a function as the self-service POS terminal 10 further having a function as the store server 60 may be used as the information processing device. The self-service POS terminal 10 serving as the information processing device may execute a part of the functions as the store server 60.

In the above-described embodiments, the member database 631 and the merchandise database 632 are stored in the auxiliary storage device 63 of the store server 60. The member database 631 and the merchandise database 632 may be stored in, for example, the main memory 12 or the auxiliary storage device 13 of the self-service POS terminal 10. In this case, the processor 11 does not need to transmit the face authentication command, the first merchandise command, and the second merchandise command to the store server 60. Then, the processor 11 may transmit, for example, a command including the learning data record (the merchandise code, the merchandise image, the second merchandise feature data, or the like) for one transaction to the store server 60 after executing, for example, the settlement. The learning data record may further include, for example, the timer value T.

In addition, although several embodiments are described, these embodiments are presented as examples and are not intended to limit the scope of the disclosure. These new embodiments can be implemented in other various forms, and various omissions, replacements, and changes can be made without departing from the spirit of the disclosure. The accompanying claims and equivalents thereof are intended to cover these embodiments and modifications as would fall within the scope of the disclosure.

What is claimed is:

1. An information processing method, comprising:
   detecting, via a sensor, a presence of a user;
   outputting an output signal to image a purchased merchandise;
   acquiring user information of the user who executes a registration operation on the purchased merchandise, wherein the user information comprises feature data of the user detected from an image of the user;
   acquiring a first time value for the registration operation based on the user information comprising quantified feature data corresponding to the feature data, wherein the first time value is an average registration time;
   storing, in imagery memory, images of the purchased merchandise; and
   switching a registration operation method for the purchased merchandise when a second time value required for the registration operation on the purchased merchandise passes the first time value, including updating a display to indicate the switch of the registration operation method and clearing the imagery memory, wherein the second time value is a time greater than the average registration time.

2. The information processing method according to claim 1, wherein the user information includes an age group of the user.

3. The information processing method according to claim 1, further comprising:
   switching from an object recognition operation performed on the purchased merchandise to a barcode recognition operation performed on the purchased merchandise.

4. The information processing method according to claim 1, further comprising:
   switching from a barcode recognition operation performed on the purchased merchandise to an object recognition operation performed on the purchased merchandise.

5. An information processing device comprising:
   an image acquirer configured to store, in imagery memory, images of a purchased merchandise;
   a first acquirer configured to:
     detect, via a sensor, a presence of a user;
     output, to the image acquirer, an outputted signal to image the purchased merchandise;
     acquire user information of the user who executes a registration operation on the purchased merchandise, wherein the user information comprises feature data of the user detected from an image of the user;
   a second acquirer configured to acquire a first time value for the registration operation based on the user information comprising quantified feature data corresponding to the feature data, wherein the first time value is an average registration time; and
   a switcher configured to switch a registration operation method for the purchased merchandise when a second time value required for the registration operation on the purchased merchandise exceeds the first time value acquired by the second acquirer, including updating a display to indicate the switch of the registration operation method and clearing the imagery memory, wherein the second time value is a time greater than the average registration time.

6. The device according to claim 5, wherein the switcher is configured to switch from a first registration operation method of recognizing and registering the image of the purchased merchandise to a second registration operation method of recognizing and registering identification information of the purchased merchandise.

7. The device according to claim 5, wherein the switcher is configured to switch from a second registration operation method of recognizing and registering identification information of the purchased merchandise to a first registration operation method of recognizing and registering the image of the purchased merchandise.

8. The device according to claim 5, wherein the user information includes an age group of the user.

9. The device according to claim 5, wherein the switcher is configured to switch from an object recognition operation performed on the purchased merchandise to a barcode recognition operation performed on the purchased merchandise.

10. The device according to claim 5, wherein the switcher is configured to switch from a barcode recognition operation performed on the purchased merchandise to an object recognition operation performed on the purchased merchandise.

11. An information processing system comprising:
   an image acquirer configured to image a user who executes a registration operation on a purchased merchandise and store, in imagery memory, images of the purchased merchandise; and
   an information processing device comprising:
      a first acquirer configured to:
      detect, via a sensor, a presence of the user;
      output, to the image acquirer, an outputted signal to image the purchased merchandise;
      acquire user information of the user, wherein the user information comprises feature data of the user detected from the image;
   a second acquirer configured to acquire a first time value for the registration operation based on the user information comprising quantified feature data corresponding to the feature data, wherein the first time value is an average registration time; and
   a switcher configured to switch a registration operation method for the purchased merchandise when a second time value required for the registration operation on the purchased merchandise exceeds the first time value acquired by the second acquirer, including updating a display to indicate the switch of the registration operation method and clearing the imagery memory, wherein the second time value is a time greater than the average registration time.

12. The information processing system according to claim 11, wherein the user information includes an age group of the user.

13. The information processing system according to claim 11, wherein the switcher is configured to switch from an object recognition operation performed on the purchased merchandise to a barcode recognition operation performed on the purchased merchandise.

14. The information processing system according to claim 11, wherein the switcher is configured to switch from a barcode recognition operation performed on the purchased merchandise to an object recognition operation performed on the purchased merchandise.

* * * * *